US012800463B2

(12) United States Patent
Mao et al.

(10) Patent No.: US 12,800,463 B2
(45) Date of Patent: Nov. 17, 2026

(54) DEVICES, KITS, AND METHODS FOR LABEL-FREE INERTIAL FERROHYDRODYNAMIC CELL SEPARATION WITH HIGH THROUGHPUT AND RESOLUTION

(71) Applicant: University of Georgia Research Foundation, Inc., Athens, GA (US)

(72) Inventors: Leidong Mao, Watkinsville, GA (US); Yang Liu, Albany, CA (US)

(73) Assignee: University of Georgia Research Foundation, Inc., Athens, GA (US)

(*) Notice: Subject to any disclaimer, the term of this patent is extended or adjusted under 35 U.S.C. 154(b) by 613 days.

(21) Appl. No.: 18/274,507

(22) PCT Filed: Feb. 3, 2022

(86) PCT No.: PCT/US2022/070512
§ 371 (c)(1),
(2) Date: Jul. 27, 2023

(87) PCT Pub. No.: WO2022/170340
PCT Pub. Date: Aug. 11, 2022

(65) Prior Publication Data

US 2024/0094106 A1 Mar. 21, 2024

Related U.S. Application Data

(60) Provisional application No. 63/145,391, filed on Feb. 3, 2021.

(51) Int. Cl.
*G01N 15/02* (2024.01)
*G01N 15/01* (2024.01)

(52) U.S. Cl.
CPC ... *G01N 15/0272* (2013.01); *G01N 2015/016* (2024.01); *G01N 2015/0288* (2013.01)

(58) Field of Classification Search
CPC ....... B01L 3/502776; B01L 2300/0816; B01L 2300/0864; B01L 2300/0883;
(Continued)

(56) References Cited

U.S. PATENT DOCUMENTS 8,186,913 B2 * 5/2012 Toner .................... F16L 41/02 435/174
9,333,510 B2 5/2016 Di Carlo et al.
(Continued)

FOREIGN PATENT DOCUMENTS

WO WO-2018195451 A1 * 10/2018 ............... B03C 1/32
WO 2019/028445 A1 2/2019

OTHER PUBLICATIONS

International Search Report and Written Opinion for WO 2022/170340 (PCT/US2022/070512), dated Apr. 12, 2022, pp. 1-10.
(Continued)

*Primary Examiner* — Jennifer Wecker
*Assistant Examiner* — Brady C Pilsbury
(74) *Attorney, Agent, or Firm* — THOMAS | HORSTEMEYER, LLP

(57) ABSTRACT

The present application provides devices, kits, and methods for label-free separation of cells and/or other small particles with high resolution and throughput. Devices, kits, and methods of the present disclosure include a focusing stage for inertial based focusing of cells/particles in a sample followed by ferrohydrodynamic, size-based separation in a separation stage. These devices, kits and methods provide the ability to separate and enrich target cells/particles from a sample with high resolution and efficiency.

25 Claims, 22 Drawing Sheets

(58) Field of Classification Search
CPC ..... B03C 1/0332; B03C 1/32; B03C 2201/18; B03C 2201/22; B03C 2201/26
See application file for complete search history.

(56) References Cited

U.S. PATENT DOCUMENTS

| | | | | |
|---|---|---|---|---|
| 10,676,719 | B2 | 6/2020 | Mao et al. | |
| 2010/0044232 | A1* | 2/2010 | Lin | B03C 1/01 204/660 |
| 2012/0080360 | A1* | 4/2012 | Stone | B03C 1/01 210/695 |
| 2012/0237997 | A1* | 9/2012 | Koser | B03C 1/023 435/173.9 |
| 2015/0293010 | A1* | 10/2015 | Nagrath | G01N 15/1023 435/308.1 |
| 2015/0336096 | A1* | 11/2015 | Smith | B03C 1/0332 435/309.1 |
| 2017/0029782 | A1* | 2/2017 | Mao | C12N 5/0695 |
| 2019/0264166 | A1* | 8/2019 | Spuhler | B01L 3/502753 |
| 2020/0129981 | A1 | 4/2020 | Mao et al. | |
| 2021/0018499 | A1 | 1/2021 | Mao et al. | |

OTHER PUBLICATIONS

Zhang. “Particle inertial focusing and separation in serpentine microchannels: mechanisms and applications” i-xxiv; 64, 86, 90, 132. University of Wollongong Thesis Collections. Web. Jan. 2015; pp. xxiv, first paragraph; Figure 3-1 64; 90, second paragraph; p. 86, second paragraph; Figure 6-5, p. 132.

Zografos. “Microfluidic converging/diverging channels optimised for homogeneous extensional deformation”, Biomicrofluidics .Web. Jul. 5, 2016.

* cited by examiner

DEVICES, KITS, AND METHODS FOR LABEL-FREE INERTIAL FERROHYDRODYNAMIC CELL SEPARATION WITH HIGH THROUGHPUT AND RESOLUTION

CROSS REFERENCE TO RELATED APPLICATIONS

This application is the National Stage of International Application No. PCT/US2022/070512, filed Feb. 3, 2022, which claims priority to and the benefit of U.S. Provisional Application Ser. No. 63/145,391, titled "Devices, Kits, and Methods for Label-Free Inertial Ferrohydrodynamic Cell Separation with High Throughput and Resolution," filed Feb. 3, 2021, the entire contents of both of which applications are entirely incorporated herein by reference.

STATEMENT REGARDING FEDERALLY SPONSORED RESEARCH OR DEVELOPMENT

This invention was made with Government support under 1150042, 1659525, and 1648035, each awarded by the National Science Foundation, and under TR002378 and EB028191, each awarded by the National Institutes of Health. The Government has certain rights in the invention.

BACKGROUND

Rapid and label-free separation of target cells in a large volume of biological samples provides unique opportunities for disease diagnostics and treatment. The ability to separate and enrich populations of scarce target cells, such as rare circulating tumor cells (CTCs), can provide valuable research tools and insights into diseases such as metastatic cancers. Other target cells, such as T lymphocytes, provide valuable candidate therapeutics for treatments such as immunotherapies. The limited availability and difficulty of obtaining useful amounts of rare CTCs is a hurdle in such research. Similarly, the ability to quickly purify sufficient amounts of T lymphocytes hinders the availability of advanced immunotherapy treatments such as adoptive cell transfer (ACT) immunotherapy. However, even with advanced technologies for cell separation, the limiting throughput, high cost and low separation resolution of currently available cell separation platforms still prevents the effectiveness of such technologies in processing large volumes of biological samples.

SUMMARY

According to various aspects, the present disclosure provides microfluidic devices, kits, and methods for separating and/or enriching cells and/or micro-particles in samples. The devices, kits and methods combine inertial focusing and ferrohydrodynamic separation to achieve size-based separation of particles in a sample with high resolution and a at thigh throughputs.

Embodiments of multi-stage microfluidic devices provided in the present disclosure for separating cells and/or micro-particles in a sample include a first microfluidic channel, an inertial focusing stage, at least two sheathing fluid channels, a ferrohydrodynamic separation stage, a magnetic source, and three or more outlets. The first microfluidic channel has a first and second end, and there is a first fluid inlet at the first end of the microfluidic channel and configured to receive a fluid sample comprising the sample combined with a ferrofluid. In embodiments, the inertial focusing stage is at the second end of the first microfluidic channel, wherein the first microfluidic channel splits into two or more serpentine focusing channels at a first end of the inertial focusing stage, each serpentine focusing channel having a plurality of alternating micro-curves configured to focus cells/particles within the sample into a narrow stream to produce a focused fluid sample stream and wherein the two or more serpentine focusing channels form a convergence at a second end of the inertial focusing stage. The at least two sheathing fluid channels are fluidly connected to one or more sheathing fluid inlets, the sheathing fluid channels configured such that the convergence of the serpentine focusing channels is between the at least two sheathing fluid channels. The ferrohydrodynamic separation stage is at the second end of the inertial focusing stage, wherein the convergence of the serpentine focusing channels further converges with the at least two sheathing fluid channels at a first end of the ferrohydrodynamic separation stage to form a ferrohydrodynamic separation channel configured such that the focused fluid sample stream exiting the convergence of the focusing channels enters the ferrohydrodynamic separation channel in a central portion of the ferrohydrodynamic separation channel and a sheathing ferrofluid exiting the sheathing fluid channels enters the ferrohydrodynamic separation channel on the periphery of the ferrohydrodynamic separation channel serving to further narrow the focused fluid sample stream and adjust its starting position in the ferrohydrodynamic separation channel. The magnetic source in the ferrohydrodynamic separation stage can be configured produce a substantially symmetric magnetic field having a field maximum along an inner longitudinal axis of the ferrohydrodynamic separation channel sufficient to cause cells/particles flowing in the ferrohydrodynamic separation channel to be deflected away from the center of the ferrohydrodynamic separation channel towards the sides of the ferrohydrodynamic separation channel as a function of the size of the cells/particles. In embodiments, the device also has three or more outlets at a second end of the ferrohydrodynamic separation stage, each outlet positioned to receive cells/particles in fluid flowing along a different portion of the ferrohydrodynamic separation channel from each of the other outlets such that cells/particles in the sample fluid are separated by size.

The present disclosure also provides kits for enriching and/or sorting unlabeled, microparticles in a fluid sample. In embodiments, the kit includes a multi-stage microfluidic device of the present disclosure and a superparamagnetic composition. The superparamagnetic composition can include a plurality of magnetic nanoparticles and a surfactant. The superparamagnetic composition is adapted to be combined with a carrier fluid to make a superparamagnetic fluid, wherein the superparamagnetic fluid can be the ferrofluid, sheathing ferrofluid, or both, for use in the multi-stage microfluidic device of the kit.

Methods of enriching and/or separating unlabeled, microparticles in a sample comprising a plurality of components are also provided in the present disclosure. In embodiments, methods of the present disclosure for enriching/separating unlabeled, microparticles in a sample include first introducing a sample fluid comprising the sample with the unlabeled, microparticles and a first ferrofluid into the first fluid inlet of a multi-stage microfluidic device for the present disclosure at a first flow rate. Next, the method includes, flowing the fluid sample through the inertial focusing stage and focusing the microparticles in the fluid sample into a focused fluid sample stream and then combining the focused fluid sample stream from the inertial focusing stage with a sheathing ferrofluid at the first end of ferrohydrodynamic separation stage such that the sheathing ferrofluid serves to further narrow the focused fluid sample stream of microparticles in the fluid sample. The focused fluid sample stream of microparticles is then flowed in the ferrohydrodynamic separation channel such that the substantially symmetric magnetic field produced by the magnetic force hydrodynamically causes cells/particles flowing in the channel to be focused away from the center of the channel towards the sides of the channel as a function of the size of the particles, such that larger particles move further toward the sides of the channel than smaller particles. The separated particles can then be collected from the at least 3 outlets.

Other systems, methods, features, and advantages of the present disclosure will be or will become apparent to one with skill in the art upon examination of the following drawings and detailed description. It is intended that all such additional systems, methods, features, and advantages be included within this description, and be within the scope of the present disclosure.

BRIEF DESCRIPTION OF THE DRAWINGS

Further aspects of the present disclosure will be more readily appreciated upon review of the detailed description of its various embodiments, described below, when taken in conjunction with the accompanying drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Figure 1A:
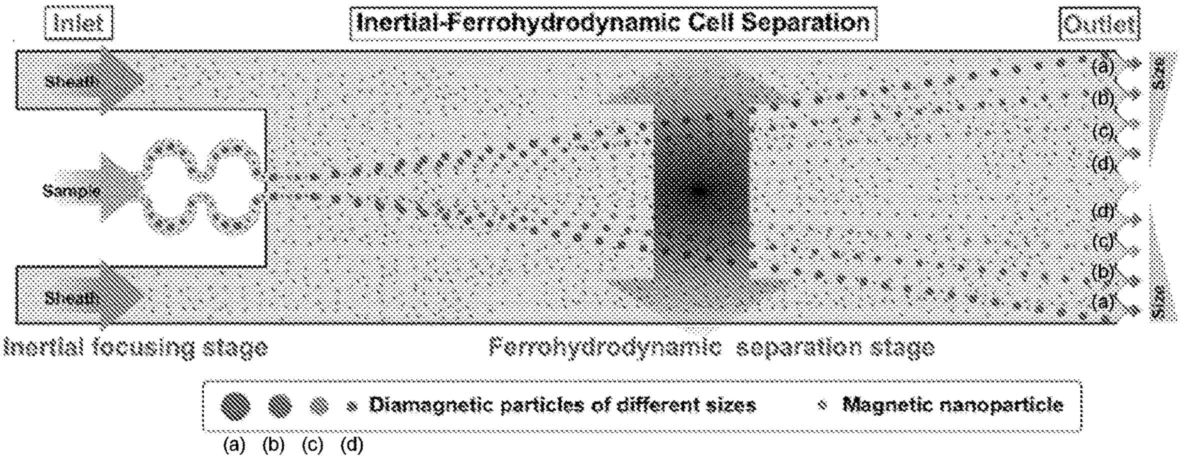
FIG. 1A illustrates an example of a working principle of the inertial-FCS according to various embodiments described herein.

Before the present disclosure is described in greater detail, it is to be understood that this disclosure is not limited to particular embodiments described, as such may, of course, vary. It is also to be understood that the terminology used herein is for the purpose of describing particular embodiments only, and is not intended to be limiting, since the scope of the present disclosure will be limited only by the appended claims.

Where a range of values is provided, it is understood that each intervening value, to the tenth of the unit of the lower limit (unless the context clearly dictates otherwise), between the upper and lower limit of that range, and any other stated or intervening value in that stated range, is encompassed within the disclosure. The upper and lower limits of these smaller ranges may independently be included in the smaller ranges and are also encompassed within the disclosure, subject to any specifically excluded limit in the stated range. Where the stated range includes one or both of the limits, ranges excluding either or both of those included limits are also included in the disclosure.

Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, the preferred methods and materials are now described.

As will be apparent to those of skill in the art upon reading this disclosure, each of the individual embodiments described and illustrated herein has discrete components and features which may be readily separated from or combined with the features of any of the other several embodiments without departing from the scope or spirit of the present disclosure. Any recited method can be carried out in the order of events recited or in any other order that is logically possible.

Embodiments of the present disclosure will employ, unless otherwise indicated, techniques of chemistry, material science, cellular biology, microfluidics, and the like, which are within the skill of the art. Such techniques are explained fully in the literature.

The following examples are put forth so as to provide those of ordinary skill in the art with a complete disclosure and description of how to perform the methods and use the compositions and compounds disclosed and claimed herein. Efforts have been made to ensure accuracy with respect to numbers (e.g., amounts, temperature, etc.), but some errors and deviations should be accounted for. Unless indicated otherwise, parts are parts by weight, temperature is in ° C., and pressure is at or near atmospheric. Standard temperature and pressure are defined as 20-25° C. and 1 atmosphere.

Before the embodiments of the present disclosure are described in detail, it is to be understood that, unless otherwise indicated, the present disclosure is not limited to particular materials, reagents, reaction materials, manufacturing processes, or the like, as such can vary. It is also to be understood that the terminology used herein is for purposes of describing particular embodiments only, and is not intended to be limiting. It is also possible in the present disclosure that steps can be executed in different sequence where this is logically possible.

All publications and patents cited in this specification are cited to disclose and describe the methods and/or materials in connection with which the publications are cited. Publications and patents that are incorporated by reference, where noted, are incorporated by reference as if each individual publication or patent were specifically and individually indicated to be incorporated by reference. Such incorporation by reference is expressly limited to the methods and/or materials described in the cited publications and patents and does not extend to any lexicographical definitions from the cited publications and patents. Any lexicographical definition in the publications and patents cited that is not also expressly repeated in the instant application should not be treated as such and should not be read as defining any terms appearing in the accompanying claims. Any terms not specifically defined within the instant application, including terms of art, are interpreted as would be understood by one of ordinary skill in the relevant art; thus, is not intended for any such terms to be defined by a lexicographical definition in any cited art, whether or not incorporated by reference herein, including but not limited to, published patents and patent applications. The citation of any publication is for its disclosure prior to the filing date and should not be construed as an admission that the present disclosure is not entitled to antedate such publication by virtue of prior disclosure. Further, the dates of publication provided could be different from the actual publication dates that may need to be independently confirmed.

Prior to describing the various embodiments, the following definitions are provided and should be used unless otherwise indicated.

Definitions

Unless defined otherwise, all technical and scientific terms used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the specification and relevant art and should not be interpreted in an idealized or overly formal sense unless expressly defined herein.

The articles "a" and "an," as used herein, mean one or more when applied to any feature in embodiments of the present invention described in the specification and claims. The use of "a" and "an" does not limit the meaning to a single feature unless such a limit is specifically stated. The article "the" preceding singular or plural nouns or noun phrases denotes a particular specified feature or particular specified features and may have a singular or plural connotation depending upon the context in which it is used.

As used herein, "comprising" is to be interpreted as specifying the presence of the stated features, integers, steps, or components as referred to, but does not preclude the presence or addition of one or more features, integers, steps, or components, or groups thereof. Moreover, each of the terms "by", "comprising," "comprises", "comprised of," "including," "includes," "included," "involving," "involves," "involved," and "such as" are used in their open, non-limiting sense and may be used interchangeably. Further, the term "comprising" is intended to include examples and aspects encompassed by the terms "consisting essentially of" and "consisting of." Similarly, the term "consisting essentially of" is intended to include examples encompassed by the term "consisting of.

In this disclosure, "consisting essentially of" or "consists essentially" or the like, when applied to methods and compositions encompassed by the present disclosure refers to compositions like those disclosed herein, but which may contain additional structural groups, composition components or method steps (or analogs or derivatives thereof as discussed above). Such additional structural groups, composition components or method steps, etc., however, do not materially affect the basic and novel characteristic(s) of the compositions or methods, compared to those of the corresponding compositions or methods disclosed herein. "Consisting essentially of" or "consists essentially" or the like, when applied to methods and compositions encompassed by the present disclosure have the meaning ascribed in U.S. patent law and the term is open-ended, allowing for the presence of more than that which is recited so long as basic or novel characteristics of that which is recited is not changed by the presence of more than that which is recited, but excludes prior art embodiments.

As used herein, "about," "approximately," "substantially," and the like, when used in connection with a numerical variable, can generally refers to the value of the variable and to all values of the variable that are within the experimental error (e.g., within the 95% confidence interval for the mean) or within +/−10% of the indicated value, whichever is greater. As used herein, the terms "about," "approximate," "at or about," and "substantially" can mean that the amount or value in question can be the exact value or a value that provides equivalent results or effects as recited in the claims or taught herein. That is, it is understood that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art such that equivalent results or effects are obtained. In some circumstances, the value that provides equivalent results or effects cannot be reasonably determined. In general, an amount, size, formulation, parameter or other quantity or characteristic is "about," "approximate," or "at or about" whether or not expressly stated to be such. It is understood that where "about," "approximate," or "at or about" is used before a quantitative value, the parameter also includes the specific quantitative value itself, unless specifically stated otherwise.

As used herein, the terms "optional" or "optionally" indicates that the subsequently described event or circumstance can or cannot occur, and that the description includes instances where said event or circumstance occurs and instances where it does not.

As used herein, "kit" refers to a collection of at least two components constituting the kit. Together, the components constitute a functional unit for a given purpose. Individual member components may be physically packaged together or separately. For example, a kit comprising an instruction for using the kit may or may not physically include the instruction with other individual member components. Instead, the instruction can be supplied as a separate member component, either in a paper form or an electronic form which may be supplied on computer readable memory device or downloaded from an internet website, or as recorded presentation.

As used herein, "instruction(s)" refers to documents describing relevant materials or methodologies pertaining to a kit. These materials may include any combination of the following: background information, list of components and their availability information (purchase information, etc.), brief or detailed protocols for using the kit, troubleshooting, references, technical support, and any other related documents. Instructions can be supplied with the kit or as a separate member component, either as a paper form or an electronic form which may be supplied on computer readable memory device or downloaded from an internet website, or as recorded presentation. Instructions can comprise one or multiple documents and are meant to include future updates.

As used herein, the term "biocompatible," with respect to a substance or fluid described herein, indicates that the substance or fluid does not adversely affect the short-term viability or long-term proliferation of a target biological particle within a particular time range.

"Curved" or "curve," as described herein, indicates a non-linear shape, where curved can include a single curve, multiple curves, and multi-directional curves, including crescent-shaped, U-shaped, serpentine, sigmoidal, and the like.

As used herein, the term "cells/particles" refers to particles, cells, or a combination of both, in a sample or mixture.

Discussion

In accordance with the purpose(s) of the present disclosure, as embodied and broadly described herein, embodiments of the present disclosure, in some aspects, relate to devices, kits, and methods for label-free separation of cells and/or other small particles with high throughput resolution, and the like. Devices, kits, and methods of the present disclosure provide for inertial based focusing of cells/particles in a sample in a focusing stage and then ferrohydrodynamic, size-based separation in a separation stage. Embodiments of such devices, kits and methods facilitate/provide the ability to separate and enrich target cells/particles from a sample with high resolution and efficiency.

High-throughput and high-resolution separation of target cells in a label-free manner from a large volume of biological samples has increasingly found applications in both fundamental biological research and clinical assays.[1-3] These target cells could harbor important information about diseases, as in the case of rare circulating tumor cells (CTCs) and metastatic cancers,[4-9] or could be candidates for potent therapeutic cells, ss in the case of T lymphocytes in cancer immunotherapies.[10-12] For example, CTCs are cancer cells that detached from primary tumors and are carried through the vasculature to potentially seed distant site metastases in vital organs. Increased knowledge about CTCs has significant implications in cancer research and clinical utilities of diagnosing and treating cancers.[4-9]. However, one major bottleneck of CTC research has been the limited availability of CTCs for investigations, due to their rarity as well as physical and biological heterogeneities in blood circulation, which typically yield only about 1-10 CTCs from one milliliter of human whole blood. The scarcity and heterogeneity of CTCs highlighted a need for new cell separation methods that could quickly enrich CTCs from a large quantity of contaminating blood cells (~$10^7$-$10^8$ white blood cells) in a clinically relevant amount of blood (~10 milliliters).

Another area that could potentially benefit from high-throughput and high-resolution cell separation devices and methods is adoptive cell transfer (ACT) immunotherapy, in which T lymphocytes are purified, genetically modified, and infused into cancer patients to mediate anti-tumor effects.[10-12]. One major bottleneck and a significant contributor to the high price point of ACT has been the cost associated with the purification of T lymphocytes from concentrated samples of human white blood cells (WBCs), which includes ~$10^9$ WBCs and other blood components including platelets and red blood cells.[13] In order to derive potent therapeutic cells in ACT, high-purity T lymphocyte separation from WBCs has become critical, which in turn spurred the development of high-throughput and high-resolution cell separation methods that can enrich a large quantities of T lymphocytes from concentrated WBCs in a low-cost manner.

Current cell separation platforms haven't met the needs for the above-mentioned applications because they faced challenges including high cost, low separation resolution and limited sample processing volume. Traditionally, target cells were separated from contaminating cells using methods including magnetically activated cell sorting (MACS) or fluorescently activated cell sorting (FACS). MACS was a label-based method that relied on the interaction between magnetic beads and surface antigens of target or contaminating cells.[14] This method had high costs due to the use of expensive equipment, antibodies and magnetic beads. On the other hand, the throughput of the FACS method was limited to ~$10^3$ cells/s,[15] far below the needed throughput (~$10^5$ cells/s) in separation of CTC or lymphocytes (e.g., B or T lymphocytes) from blood samples, often loses as much as 50% or more of cells, and also requires expensive equipment. A majority of existing microfluidic cell separation methods, despite their precision, also suffered from low throughput as they typically were limited to processing only small amounts of biological sample in the range of microliters to a few milliliters (see Example 2, below, for comparison).[16-21] Recently developed inertial force based microfluidic systems, resulted in focusing and separation of biological particles with extremely high throughputs (>$10^5$ cells/s), but suffered from low separation resolution resulting in low target cell recovery.[22-27] These challenges in currently available methods highlighted an urgent need to develop a high-throughput and high resolution method that can separate target cells from a large volume of biological samples in a low-cost manner.

To address this need, the present disclosure provides a label-free, inertial-ferrohydrodynamic cell separation (inertial-FCS) method that integrates inertial focusing and ferrohydrodynamic separation of cells according to their physical size/diameters. Briefly described, first a sample (e.g., lysed blood sample including target cells/particles and non-target cells/particles) is combined with a ferrofluid to produce a fluid sample, which is then introduced into the device of the present disclosure. The fluid sample passes through an inertial focusing stage which functions to focus cells/particles within the sample into a narrow stream. The focused fluid sample is then combined with a sheathing fluid (e.g., additional ferrofluid) as it enters a ferrohydrodynamic separation stage. The addition of the sheathing fluid produces sheath flow which further focuses the cell stream and adjusts the starting position of the stream in the ferrohydrodynamic separation channel, where cells/particles in the focused stream from the focusing stage are then separated based on their volumes under a magnetic field as a function of their size-based magnetic buoyancy.

Embodiments, of multi-stage microfluidic devices of the present disclosure for separating cells/particles in a sample can include an inertial focusing stage, a ferrohydrodynamic separation stage, a magnetic source, and outlets as described below. In embodiments, the inertial focusing stage includes two or more serpentine focusing channels at a first end of the inertial focusing stage, with each channel having a plurality of alternating micro-curves configured to focus cells/particles within the sample into a narrow stream to produce a focused fluid sample stream. In embodiments, the two or more serpentine focusing channels form a convergence at a second end of the inertial focusing stage. The ferrohydrodynamic separation stage is at the second end of the inertial focusing stage, where the convergence of the serpentine focusing channels further converges with at least two sheathing fluid channels to form a ferrohydrodynamic separation channel. In embodiments, this area is configured such that the focused fluid sample stream exiting the convergence of the focusing channels enters the ferrohydrodynamic separation channel in a central portion of the ferrohydrodynamic separation channel and a sheathing ferrofluid exiting the sheathing fluid channels enters the ferrohydrodynamic separation channel on the periphery of the ferrohydrodynamic separation channel. This configuration serves to further narrow the focused fluid sample stream and adjust its starting position in the ferrohydrodynamic separation channel. Devices of the present disclosure also include a magnetic source in the ferrohydrodynamic separation stage configured produce a substantially symmetric magnetic field having a field maximum along an inner longitudinal axis of the ferrohydrodynamic separation channel. This magnetic field causes cells/particles flowing in the ferrohydrodynamic separation channel to be deflected away from the center of the ferrohydrodynamic separation channel towards the sides of the ferrohydrodynamic separation channel as a function of the size of the cells/particles. At the second end of the ferrohydrodynamic separation stage, devices of the present disclosure include outlets (e.g., 3 or more). The outlets are positioned to receive cells/particles in fluid flowing along a different portion of the ferrohydrodynamic separation channel from each of the other outlets such that cells/particles in the sample fluid are separated by size. Additional description of these and other features of devices of the present disclosure are provided below.

Figure 1B:
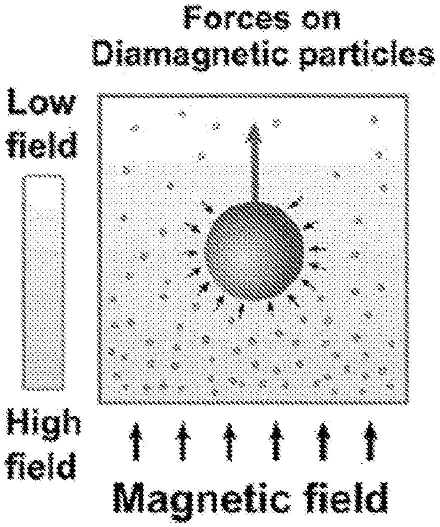
FIG. 1B illustrates an example schematic of a diamagnetic particle experiencing ferrohydrodynamic force in a colloidally-stable magnetic nanoparticle suspension according to various embodiments described herein.

In embodiments of devices and methods described in greater detail below and illustrated in FIG. 1D and FIG. 7, a fluid sample (e.g., sample combined with a ferrofluid, which can be biocompatible if the sample contains living cells/biological particles) is introduced through a sample inlet ("Inlet A-sample inlet" in FIG. 1D) of a microfluidic separation device of the present disclosure and into a first microfluidic channel. The sample inlet is located at a first end of the microfluidic channel. The first microfluidic channel may include one or more filters ("debris filters" in FIG. 1D) in a filter stage located after the inlet. The fluid sample may pass through a filter stage in the first channel to remove any large debris (e.g., particles larger than typical cell size). After the optional filter stage, at a second end of the first microfluidic channel, the sample then enters the inertial focusing stage. In embodiments, such as illustrated in FIG. 1D, the first microfluidic channel may contain one or more curves/bends between the inlet, optional filers, and the inertial focusing stage. In embodiments, such one or more curves or bends in the channel may serve to adjust the flow rate of the fluid sample prior to entering the inertial focusing stage and/or they may serve to spatially arrange the various components and stages of the device in a more functional/compact arrangement on a substrate, such as a slide.

In the inertial focusing stage, the first microfluidic channel splits into two or more serpentine channels having multiple alternating micro-curves which serve to focus cells/particles within the sample into a narrow stream. In embodiments, such as depicted in FIG. 1D, FIG. 7, and FIG. 8, the serpentine inertial focusing channels have a sigmoidal shape with alternating micro-curves. As the sample passes through the micro-curves of the inertial focusing channels, this focuses cells and/or particles in the fluid sample into a narrow stream to produce a focused fluid sample stream. In embodiments, the width of the serpentine inertial focusing channels can vary along the length of the channel in various parts of the curvature.

In embodiments, such as illustrated in FIG. 8, the interior channel width/diameter of the serpentine inertial focusing channels can range from about 50-200 μm at the narrower portions and from about 100-400 μm at the wider portions. In embodiments, in the number of alternating micro-curves (or serpentine fragments) in the serpentine inertial focusing channels can be from about 30-50. In embodiments, such as illustrated in FIG. 8, the serpentine inertial focusing channel can include alternating smaller and larger micro-curves, where the inner major axis of the smaller curve is about 100-400 μm in length and the inner major axis of the larger curve is about 300-1200 μm in length. In embodiments the narrowest portion of the channel is at the crest of the smaller curves, and the broadest portion of the channel is at the crest of the larger curves. In embodiments, the amplitude of the area under the larger curve is about 100-400 μm, as illustrated in FIG. 8. The dimensions of the micro-curves in the inertial focusing stage and the number of curves help to achieve a very narrow focused fluid sample stream (about 4-100 μm in width) which directly influences the separation resolution of the subsequent separation stage. The dimensions and number of alternating curves can be optimized for the diameters of cells/particles and the desired flow rate. For example, the dimensions described above and illustrated in FIG. 8 are optimized for focusing of cells with a physical diameter in the range of about 4-40 μm under flow rates in the device of about 200-1400 μL/min. Some previous devices have used inertial separation stages with different features to influence the flow direction of particles (e.g., focusing to the center of a channel) as opposed to the devices of the present disclosure where the inertial focusing stage design provides a narrow focused fluid sample stream with a desired width to facilitate subsequence cell separation.

Figure 7:
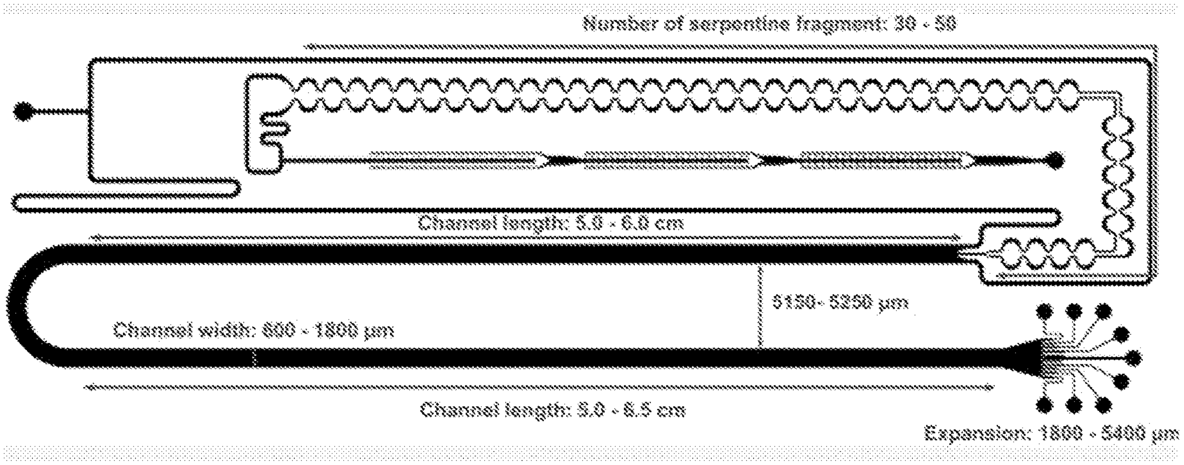
FIG. 7 illustrates an enlarged image of FIG. 1D with representative dimensions according to various embodiments described herein.
Figure 8:
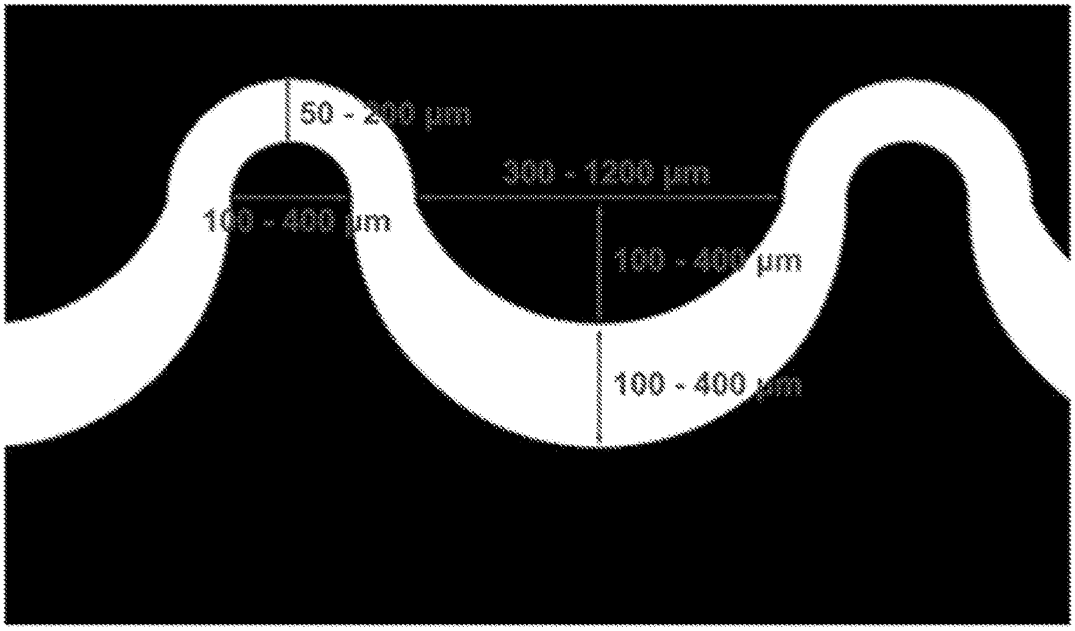
FIG. 8 illustrates an enlarged segment of one of serpentine inertial focusing channels showing alternating micro-curves according to various embodiments described herein.

In embodiments the overall inertial focusing stage (e.g., the combined serpentine inertial focusing channels and any areas between sections of micro-curves) can include 1 or more larger bends/curves (e.g., in an L or U-shaped configuration such as illustrated in FIG. 1D and FIG. 7) before entering/transitioning to the ferrohydrodynamic separation stage.

Figure 1C:
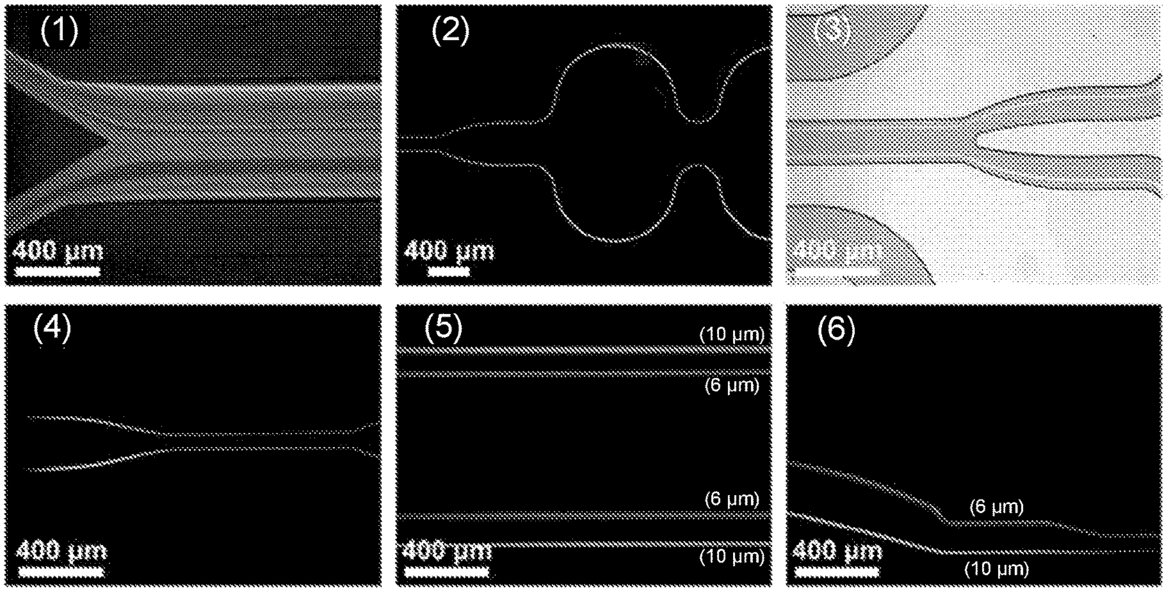
FIG. 1C illustrates example images of the inertial-FCS channel in operation according to various embodiments described herein.
Figure 1D:
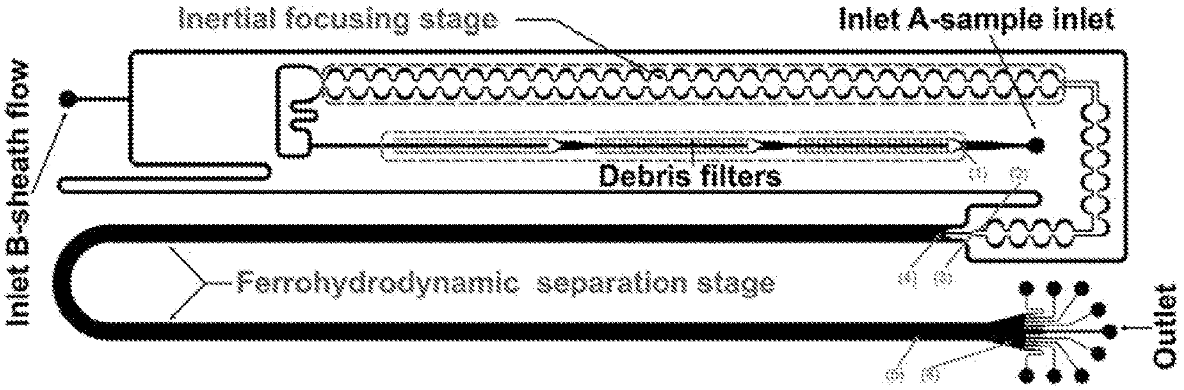
FIG. 1D illustrates an example top-view schematic drawing of the inertial-FCS device channel according to various embodiments described herein.

In embodiments of the microfluidic separation device of the present disclosure, as illustrated in FIG. 1D and FIG. 7, the two or more serpentine inertial focusing channels converge at a second end of the inertial focusing stage to form a convergence (see the area marked (3) in FIG. 1D and the corresponding image (3) in FIG. 1C) and are also joined by at least two sheathing fluid channels at the first end (or "entrance") of the ferrohydrodynamic separation stage. In embodiments, the microfluidic device of the present disclosure is configured such that the convergence of the focusing channels is between the at least two sheathing fluid channels (such as illustrated in FIG. 1D, and FIG. 1C, panel 3). In embodiments, the device is configured such that the convergence of the focusing channels further converges with the sheathing fluid channels (such as illustrated in FIG. 1D, at marker (4) and corresponding panel (40 in FIG. 1C) to enter a single ferrohydrodynamic separation channel.

The sheathing fluid channels are fluidly connected to one or more sheathing fluid inlets (identified as "Inlet B-sheath flow" in the embodiment illustrated in FIG. 1D), such that sheathing fluid can be added to the device at the sheathing fluid inlet. The sheathing fluid channels join the focusing channels at an entrance of the ferrohydrodynamic separation channel such that at the position where the sheathing fluid channels converge with the focusing channels, the focused fluid sample stream exiting the converged focusing channels enters the ferrohydrodynamic separation channel in a central portion of the channel, and sheathing ferrofluid exiting the sheathing fluid channels enters the ferrohydrodynamic separation channel on the periphery of the ferrohydrodynamic separation channel and serves to further narrow the focused fluid sample stream. The sheath flow provided by the addition of the sheathing fluid also functions to adjust the starting positions of the focused fluid sample stream toward the center of the ferrohydrodynamic separation channel.

Figure 9:
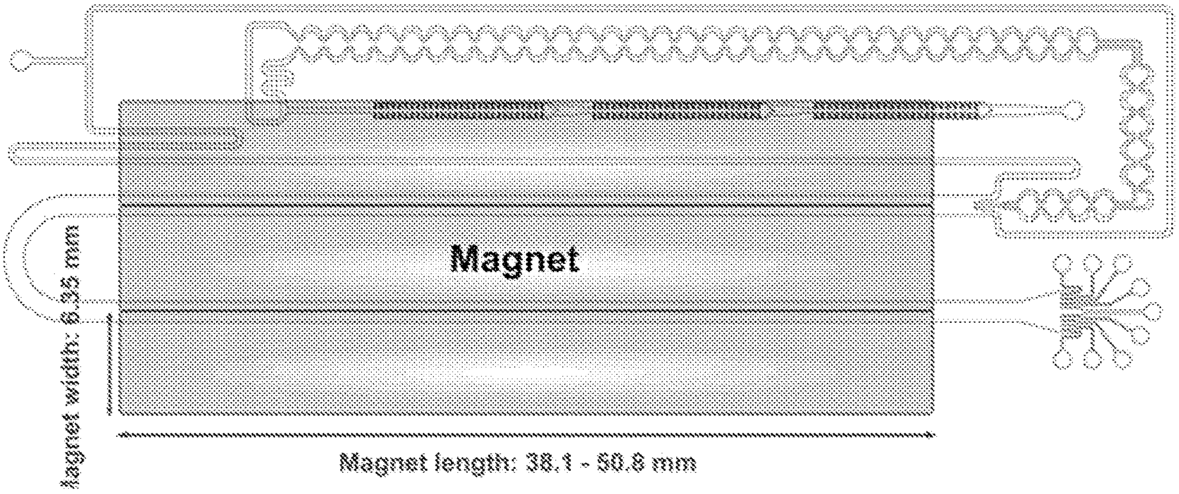
FIG. 9 illustrates an enlarged image of portion of FIG. 2A showing magnet configuration in device, with representative dimensions of magnet according to various embodiments described herein.

The ferrohydrodynamic separation stage also includes a magnetic source configured to produce a substantially symmetric magnetic field having a field maximum along an inner longitudinal axis of the ferrohydrodynamic separation channel sufficient to cause cells/particles to be focused away from the center of the channel towards the sides of the channel as a function of the size of the particles. In embodiments the device is configured such that the magnetic field causes larger cells/particles to be focused further towards the sides/periphery of the channel, such as illustrated in FIG. 1A and panel (5) in FIG. 1C. In embodiments, such as illustrated in FIG. 1D and FIG. 7, the ferrohydrodynamic separation channel has first section and a second section connected by a substantially u-shaped curve (such u-shaped curve may be a soft curve or squared curve), such that the ferrohydrodynamic separation channel passes through the magnetic field twice to increase separation of the particles as shown in FIG. 9.

Figure 2A:
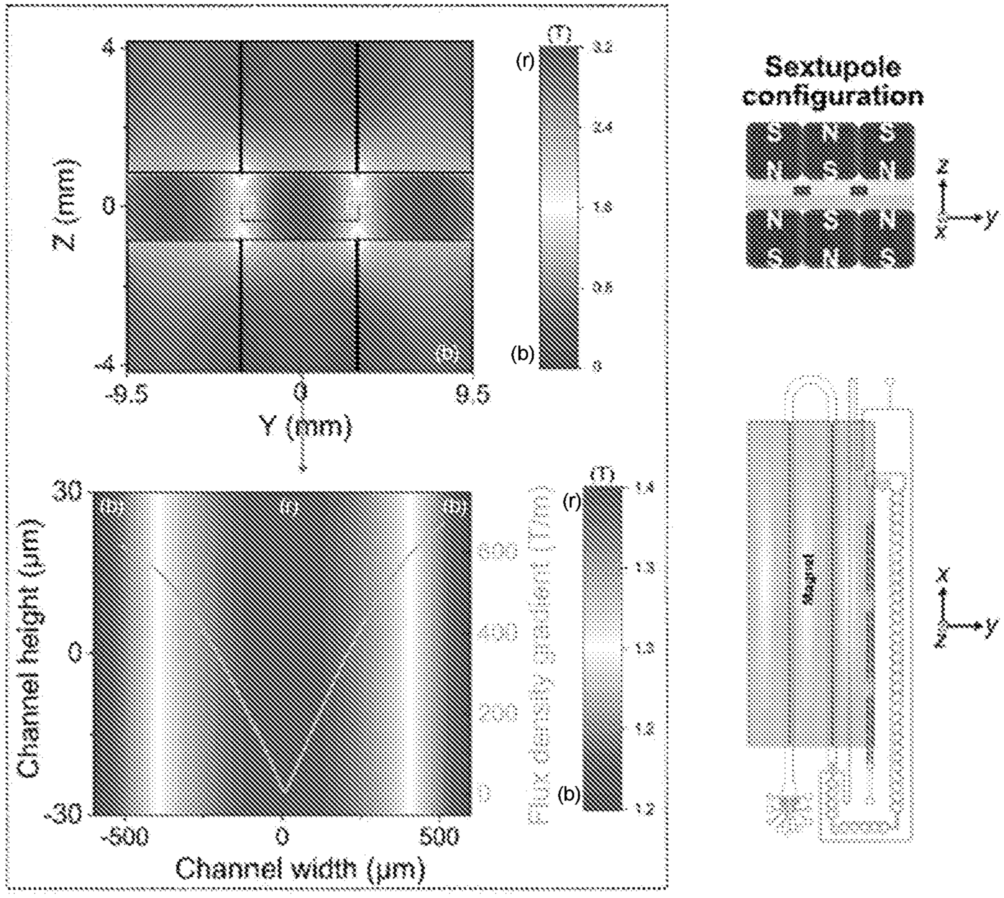
FIG. 2A illustrates an example sextupole magnet configuration in the inertial-FCS device generated a high magnetic flux density and its gradient sufficient for cell separation according to various embodiments described herein.

In embodiments, the magnetic source is provided by an array of magnets including a top array and bottom array, wherein the ferrohydrodynamic separation stage is sandwiched between and substantially centrally aligned between the top magnet array and the bottom magnet array, wherein the magnets in the top array are oriented to repel the magnets in the bottom array. In embodiments, the magnetic source is an arrangement of magnets such as illustrated in FIG. 2A and FIG. 9. In embodiments, the array includes 6 magnets in a sextupole configuration and are arranged to repel each other, such as illustrated in FIG. 2. In embodiments, the magnets are configured to generate a magnetic flux density gradient with the highest magnetic flux density located at the center of the channel (e.g., in the x-y plane (z=0)) and where the distribution of the flux density was substantially symmetric in the channel in the y-direction. In embodiments, the magnetic force produces a magnetic flux density of about (0.5-3.2 T (e.g., about 1.4 T) toward the center of the channel and a magnetic flux density gradient of about 300-1800 T $m^{-1}$ (e.g., about 600 T $m^{-1}$). In embodiments, each of the magnets in the arrangement can have dimensions such as, but not limited to 50.8 mm×6.35 mm×6.35 mm (L×W×H); 38.1 mm×6.35 mm×6.35 mm (L×W×H), or other applicable dimensions.

Figure 3A:
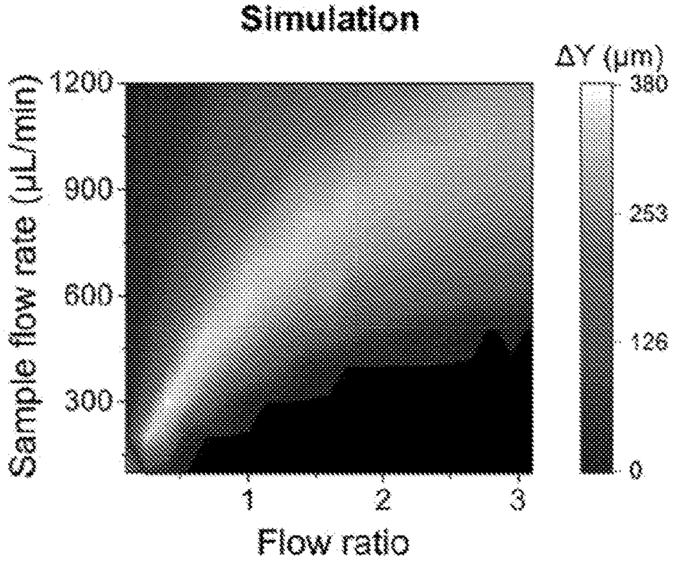
FIG. 3A illustrates an example of the dependence of the diamagnetic particle separation distance ($\Delta Y$) on the sample flow rate and the ratio between the sample and sheath flow according to various embodiments described herein.
Figure 3B:
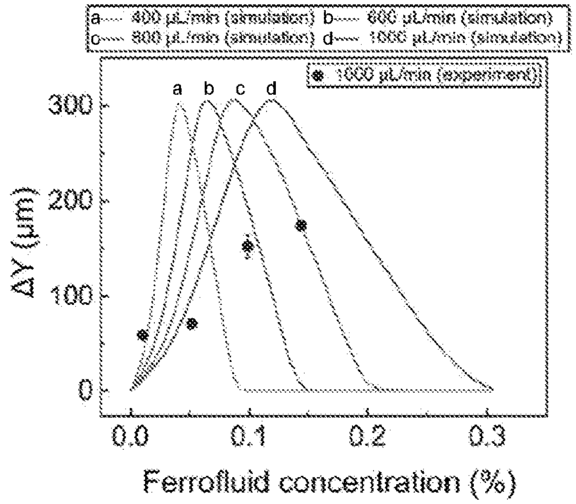
FIG. 3B illustrates an example of the dependence of the separation distance ($\Delta Y$) on the ferrofluid concentration (v/v) at variable sample flow rates according to various embodiments described herein.
Figure 3C:
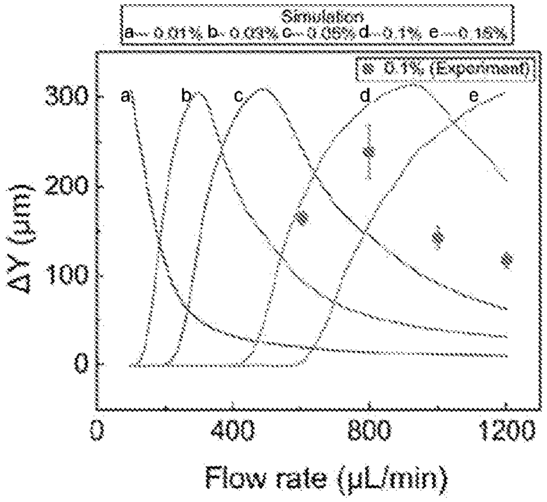
FIG. 3C illustrates an example of the of the separation distance ($\Delta Y$) on the sample flow rate at variable ferrofluid concentrations according to various embodiments described herein.
Figure 3E:
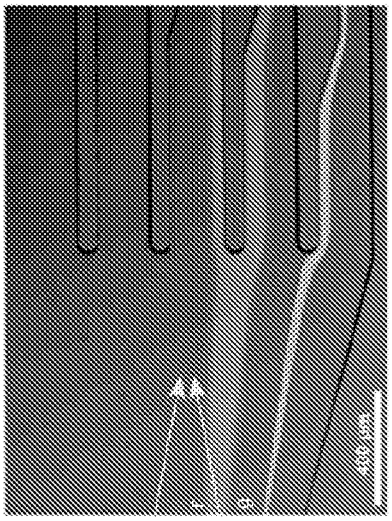
FIG. 3E illustrates an example fluorescence image showing clear separation of particles at the outlets of the inertial-FCS device according to various embodiments described herein.

After the ferrohydrodynamic separation stage, the device includes three or more outlets fluidly connected to an end of the ferrohydrodynamic separation channel (see reference number (6) of FIG. 1D), where each of the outlets is positioned to receive cells/particles in fluid flowing along a different portion of the channel from each of the other outlets such that cells/particles in the sample fluid are separated by size. Some examples of embodiments of outlet configurations are illustrated in FIG. 3E, FIG. 4F, and FIG. 5A. In embodiments, the outlets are configured such that at least one outlet is positioned to receive unlabeled cells/particles in fluid flowing along a central portion of the ferrohydrodynamic separation channel and wherein at least 2 other outlets are positioned to receive cells/particles in fluid flowing along a periphery of the microfluidic channel. Typically, outlets collecting fluid flowing along a central portion of the ferrohydrodynamic separation channel will contain smaller cells/particles, while outlets collecting fluid flowing along the outer portions of the microfluidic channel will collect larger cells/particles. In embodiments the device can include about 3 or more (e.g., 4 or more, 5 or more, 6 or more, etc.) outlets. In embodiments, the device has from about 3-10 outlets, where outlets further toward the outer edges of the ferrohydrodynamic separation channel collect progressively larger particles and outlets toward the center of the separation channel collect progressively smaller particles the closer the outlet is to the central longitudinal axis of the ferrohydrodynamic separation channel. The embodiment illustrated in FIG. 1D and FIG. 7 includes 9 outlets, with the $5^{th}$ outlet being located most aligned with the central longitudinal axis of the ferrohydrodynamic separation channel, such as illustrated in FIGS. 4G and 4F and the close-ups of outlets 1-5 in FIG. 5A.

The ferrofluid and sheathing ferrofluid each include a plurality of magnetic microparticles, a surfactant, and a carrier fluid. In embodiments, the ferrofluid and sheathing ferrofluid can have the same makeup, in other words they can be the same fluid but are introduced at different points of the device as described above. In embodiments the ferrofluid/sheathing ferrofluid is a biocompatible superparamagnetic fluid including magnetic nanoparticles, a biocompatible surfactant, and a biocompatible carrier fluid. In embodiments, the surfactant improves the biocompatibility of the magnetic nanoparticles. In embodiments, the ferrofluid/sheathing ferrofluid has concentration of magnetic nanoparticles of about 0.001-1% (v/v), such as about 0.01-1% (v/v) and other intervening ranges.

In embodiments, the devices of the present disclosure can be used to separate circulating tumor cells, lymphocytes or other target cells from white blood cells and other non-target/contaminating cells in a sample, such as a blood sample. As described in greater detail in the discussion and examples below, the devices, kits, and methods of the present disclosure can separate target cells from contaminating cells with a high throughput (e.g., about $10^4$ cells/s to $2\times10^5$ cells/s, such as, for example, $10^5$ cells/s), a high sample processing flow rate (e.g., about 200-1400 μL/min such as, for example, 60 mL/h (1000 μL/min) and a high separation resolution (e.g., about 0.5-2 μm, such as, for example, 1-2 μm) in cellular diameter difference. Due to its label-free nature, this method didn't require the use of antibodies and magnetic beads and could lower the cost of cell separations.

The present disclosure also provides kits for enriching and/or sorting unlabeled, microparticles in a fluid sample, where the kits include a multi-stage microfluidic focusing and separation device of the present disclosure along with a superparamagnetic composition for making the ferrofluid/sheathing ferrofluid for use in the device. In embodiments the superparamagnetic composition includes a plurality of magnetic nanoparticles and a surfactant. The superparamagnetic composition is adapted to be combined with a carrier fluid to make a superparamagnetic fluid that can be the ferrofluid, sheathing ferrofluid, or both, for use in the multi-stage microfluidic device. In embodiments, kits of the present disclosure can also include instructions for combining the magnetic nanoparticles, surfactant, and carrier fluid to make the superparamagnetic fluid and instructions for using the superparamagnetic fluid and the multi-stage microfluidic device to separate cells/particles in a fluid sample. Instructions can also include information such as desired flow rates, concentration of ferrofluids/sheathing fluids, and the like.

In embodiments of kits of the present disclosure, the surfactant is biocompatible such that it renders the superparamagnetic composition biocompatible for use with samples that include cells, other biological particles, or both. In such embodiments the kit may also include instructions for combining the superparamagnetic composition with a biocompatible carrier fluid. In embodiments, the ferrofluid and the sheathing ferrofluid have a concentration of magnetic nanoparticles of about 0.001-1% (v/v).

The present disclosure also provides methods for enriching and/or separating microparticles in a sample that includes plurality of components of different sizes. For instance, methods of the present disclosure can be used to separate particles (e.g., cells and other particles) from each other based on the size of the target cells/particles. In embodiments, the cells/particles (both target and/or non-target cells/particles can be unlabeled, since labeling is not needed for separation with the devices and methods of the present disclosure. In some of the examples below, the cells/particles may be labeled for purposes of visualization of particle streams for demonstration and/or for identification of cell/particle type after testing; however, such labeling is for verification/demonstration and is not needed for cell separation as in other methods.

According to some embodiments, methods of the present disclosure include providing a sample fluid including a sample with unlabeled microparticles (e.g., cells or other microparticles) and a first ferrofluid. Then, the method includes using inertial focusing forces to focus the microparticles in the fluid sample into a focused fluid sample stream. Next the focused fluid sample stream is combined with a sheathing ferrofluid such that the sheathing ferrofluid serves to further narrow the focused fluid sample stream of microparticles in the fluid sample (and to also adjust the location of the focused fluid sample stream, e.g., in a device). Then methods of the present disclosure include flowing the focused fluid sample stream of microparticles through a substantially symmetric magnetic field such that the substantially symmetric magnetic field hydrodynamically causes microparticles flowing in the focused fluid sample stream to move relative to a center of the stream as a function of the size of the microparticles, such that larger microparticles are deflected further away from the center of the stream than smaller microparticles. Then the separated microparticles can be collected (e.g., in outlets) in groups based on location of the microparticles relative to the center of the stream. The groups of separated microparticles will have different sizes depending on the location since the location at collection was based on deflection as a function of the size of the microparticles.

In embodiments of methods of the present disclosure, a sample fluid (e.g., whole blood, lysed blood, other biological fluids, etc.) and a first ferrofluid is introduced into a multi-stage microfluidic separation device of the present disclosure. The sample fluid includes microparticles (e.g., unlabeled microparticles), and the sample fluid can be combined with the first ferrofluid prior to or at the time of introduction to the device, this mixed fluid sample/ferrofluid is also referred to as simply the "fluid sample". The fluids are introduced at the first fluid inlet of the device at a first flow rate. Then the fluid sample is flowed through the inertial focusing stage where the microparticles in the fluid sample are focused into a focused fluid sample stream. The focused fluid sample stream from the inertial focusing stage is then combined with a sheathing ferrofluid at the first end of ferrohydrodynamic separation stage such that the sheathing ferrofluid serves to further narrow the focused fluid sample stream of microparticles in the fluid sample and adjust the starting positions of the focused fluid sample stream in the channel. This focused fluid sample stream of microparticles is then flowed through the ferrohydrodynamic separation channel such that the substantially symmetric magnetic field produced by the magnetic force hydrodynamically causes cells/particles flowing in the channel to be focused away from the center of the channel towards the sides of the channel as a function of the size of the particles, such that larger particles move further toward the sides of the channel than smaller particles. These separated particles form size-based fluid particle streams that flow toward the outlets, such that streams with larger particles move toward outlets located near the periphery/sides of the channel, and streams with smaller particles flow toward outlets more centrally-aligned with the center portion of the ferrohydrodynamic separation channel. The method then includes collecting separated particles from the outlets. The devices of the present disclosure include 3 or more outlets, as described above. Some embodiments have about 3-10 outlets.

In some methods of the present disclosure, the sample is a lysed blood sample, the microparticles are cells the target cells are selected from circulating tumor cells and lymphocytes, and the cells include white blood cells and target cells. According to some methods the target cells are selected from circulating tumor cells and lymphocytes. The microparticles in some embodiments, have varying physical diameters (e.g., different types of particles have different diameters), such as particle diameters from about 4-40 μm. In some embodiments, after exiting the inertial focusing stage and/or when first entering the first end of the ferrohydrodynamic separation stage, the focused fluid sample stream has a width of about 4-100 μm. In embodiments, the fluid sample is processed in the device at a flow rate of about 200-1400 μL/min.

Having described the devices, kids, and methods of the present disclosure generally, some various aspects are set forth below, followed by some representative examples.

Various Aspects and Embodiments of the Present Disclosure

The present disclosure further includes the following aspects and embodiments.

Aspect 1: A multi-stage microfluidic device for separating cells and/or micro-particles in a sample, the device comprising:

- a first microfluidic channel having a first and second end;
- a first fluid inlet at the first end of the microfluidic channel and configured to receive a fluid sample comprising the sample combined with a ferrofluid;
- an inertial focusing stage at the second end of the first microfluidic channel, wherein the first microfluidic channel splits into two or more serpentine focusing channels at a first end of the inertial focusing stage, each serpentine focusing channel having a plurality of alternating micro-curves configured to focus cells/particles within the sample into a narrow stream to produce a focused fluid sample stream and wherein the two or more serpentine focusing channels form a convergence at a second end of the inertial focusing stage;
- at least two sheathing fluid channels fluidly connected to one or more sheathing fluid inlets, the sheathing fluid channels configured such that the convergence of the serpentine focusing channels is between the at least two sheathing fluid channels;
- a ferrohydrodynamic separation stage at the second end of the inertial focusing stage, wherein the convergence of the serpentine focusing channels further converges with the at least two sheathing fluid channels at a first end of the ferrohydrodynamic separation stage to form a ferrohydrodynamic separation channel configured such that the focused fluid sample stream exiting the convergence of the focusing channels enters the ferrohydrodynamic separation channel in a central portion of the ferrohydrodynamic separation channel and a sheathing ferrofluid exiting the sheathing fluid channels enters the ferrohydrodynamic separation channel on the periphery of the ferrohydrodynamic separation channel serving to further narrow the focused fluid sample stream and adjust its starting position in the ferrohydrodynamic separation channel;

a magnetic source in the ferrohydrodynamic separation stage configured produce a substantially symmetric magnetic field having a field maximum along an inner longitudinal axis of the ferrohydrodynamic separation channel sufficient to cause cells/particles flowing in the ferrohydrodynamic separation channel to be deflected away from the center of the ferrohydrodynamic separation channel towards the sides of the ferrohydrodynamic separation channel as a function of the size of the cells/particles; and three or more outlets at a second end of the ferrohydrodynamic separation stage, each outlet positioned to receive cells/particles in fluid flowing along a different portion of the ferrohydrodynamic separation channel from each of the other outlets such that cells/particles in the sample fluid are separated by size.

Aspect 2: The multi-stage microfluidic device of aspect 1, wherein the magnetic source comprises an array of magnets comprising a top array and bottom array, wherein the ferrohydrodynamic separation stage is sandwiched between and substantially centrally aligned between the top magnet array and the bottom magnet array, wherein the magnets in the top array are oriented to repel the magnets in the bottom array.

Aspect 3: The multi-stage microfluidic device of aspect 2, wherein the array of magnets comprises six magnets arranged in a sextupole configuration.

Aspect 4: The multi-stage microfluidic device of any of aspects 1-3, wherein the first microfluidic channel comprises one or more filters between the inlet and the second end of the first microfluidic channel, the filters configured to separate debris from the fluid sample.

Aspect 5: The multi-stage microfluidic device of any of aspects 1-4, wherein the first microfluidic channel comprises one or more bends at the second end of the first microfluidic channel before the inertial focusing stage.

Aspect 6: The multi-stage microfluidic device of any of aspects 1-5, wherein the two or more serpentine focusing channels each comprise about 30-50 alternating micro-curves.

Aspect 7: The multi-stage microfluidic device of any of aspects 1-6, wherein the serpentine focusing channels comprise alternating small and large micro-curves.

Aspect 8: The multi-stage microfluidic device of aspect 7, wherein an interior channel width of each serpentine focusing channel varies along the length of said channel, wherein the interior channel width at a crest portion of each smaller micro-curve is about 50-200 μm and wherein the interior channel width at a crest portion of each larger micro-curve is about 100-400 μm.

Aspect 9: The multi-stage microfluidic device of any of aspects 1-8, wherein the ferrohydrodynamic separation channel comprises a first section and a second section connected by a substantially u-shaped curve, such that the ferrohydrodynamic separation channel passes through the magnetic field twice to increase separation of the particles.

Aspect 10: The multi-stage microfluidic device of any of aspects 1-9, wherein the sample is a lysed blood sample, and the cells/particles comprise white blood cells and target cells.

Aspect 11: The multi-stage microfluidic device of aspect 10, wherein target cells are selected from circulating tumor cells and lymphocytes.

Aspect 12: The multi-stage microfluidic device of any of aspects 1-11, wherein the ferrofluid and the sheathing ferrofluid each comprise a plurality of magnetic nanoparticles, a surfactant, and a carrier fluid.

Aspect 13: A kit for enriching and/or sorting unlabeled, microparticles in a fluid sample, the kit comprising:

the multi-stage microfluidic device of any of aspects 1-12; and a superparamagnetic composition comprising a plurality of magnetic nanoparticles and a surfactant, the superparamagnetic composition adapted to be combined with a carrier fluid to make a superparamagnetic fluid, wherein the superparamagnetic fluid can be the ferrofluid, sheathing ferrofluid, or both, for use in the multi-stage microfluidic device of the kit.

Aspect 14: The kit of aspect 13, further comprising:

instructions for combining the magnetic nanoparticles, surfactant, and carrier fluid to make the superparamagnetic fluid and instructions for using the superparamagnetic fluid and the multi-stage microfluidic device to separate cells/particles in a fluid sample.

Aspect 15: The kit of any of aspects 13-14, wherein the surfactant is biocompatible.

Aspect 16: The kit of any of aspects 13-15, wherein the ferrofluid and the sheathing ferrofluid have a concentration of magnetic nanoparticles of about 0.001-1% (v/v).

Aspect 17: A method of enriching and/or separating unlabeled, microparticles in a sample comprising a plurality of components, the method comprising:

introducing a sample fluid comprising the sample with the unlabeled, microparticles and a first ferrofluid into the first fluid inlet of a multi-stage microfluidic device according to any of aspects 1-12 at a first flow rate;

flowing the fluid sample through the inertial focusing stage and focusing the microparticles in the fluid sample into a focused fluid sample stream;

combining the focused fluid sample stream from the inertial focusing stage with a sheathing ferrofluid at the first end of ferrohydrodynamic separation stage such that the sheathing ferrofluid serves to further narrow the focused fluid sample stream of microparticles in the fluid sample;

flowing the focused fluid sample stream of microparticles in the ferrohydrodynamic separation channel such that the substantially symmetric magnetic field produced by the magnetic force hydrodynamically causes cells/particles flowing in the channel to be focused away from the center of the channel towards the sides of the channel as a function of the size of the particles, such that larger particles move further toward the sides of the channel than smaller particles; and collecting separated particles from the at least 3 outlets.

Aspect 18: The method of aspect 17, wherein the sample is a lysed blood sample, the microparticles are cells, and the cells include white blood cells and target cells.

Aspect 19: The method of any of aspects 17-18, wherein the target cells are selected from circulating tumor cells and lymphocytes.

Aspect 20: The method of any of aspects 17-19, wherein the microparticles have varying physical diameters in a range of about 4-40 μm.

Aspect 21: The method of any of aspects 17-20, wherein the focused fluid sample stream has a width of about 4-100 μm when it enters the first end of ferrohydrodynamic separation stage.

Aspect 22: The method of any of aspects 17-20, wherein the fluid sample is processed in the device at a flow rate of about 200-1400 μL/min.

Aspect 23: A multi-stage microfluidic device for separating cells/particles in a sample, the device comprising:

an inertial focusing stage comprising two or more serpentine focusing channels at a first end of the inertial focusing stage, each serpentine focusing channel having a plurality of alternating micro-curves configured to focus cells/particles within the sample into a narrow stream to produce a focused fluid sample stream and wherein the two or more serpentine focusing channels form a convergence at a second end of the inertial focusing stage;

a ferrohydrodynamic separation stage at the second end of the inertial focusing stage, wherein the convergence of the serpentine focusing channels further converges with at least two sheathing fluid channels at a first end of the ferrohydrodynamic separation stage to form a ferrohydrodynamic separation channel configured such that the focused fluid sample stream exiting the convergence of the focusing channels enters the ferrohydrodynamic separation channel in a central portion of the ferrohydrodynamic separation channel and a sheathing ferrofluid exiting the sheathing fluid channels enters the ferrohydrodynamic separation channel on the periphery of the ferrohydrodynamic separation channel serving to further narrow the focused fluid sample stream and adjust its starting position in the ferrohydrodynamic separation channel;

a magnetic source in the ferrohydrodynamic separation stage configured produce a substantially symmetric magnetic field having a field maximum along an inner longitudinal axis of the ferrohydrodynamic separation channel sufficient to cause cells/particles flowing in the ferrohydrodynamic separation channel to be deflected away from the center of the ferrohydrodynamic separation channel towards the sides of the ferrohydrodynamic separation channel as a function of the size of the cells/particles; and three or more outlets at a second end of the ferrohydrodynamic separation stage, each outlet positioned to receive cells/particles in fluid flowing along a different portion of the ferrohydrodynamic separation channel from each of the other outlets such that cells/particles in the sample fluid are separated by size.

The features of the device of aspect 23 can also be combined with any of the features of the devices of aspects 1-12 above, with the kits of aspects 12-16, and with the methods of aspects 17-22.

Aspect 24: A method of enriching and/or separating unlabeled microparticles in a sample comprising a plurality of components, the method comprising:

providing a sample fluid comprising the sample with the unlabeled microparticles and a first ferrofluid;

focusing, using inertial focusing forces, the microparticles in the fluid sample into a focused fluid sample stream;

combining the focused fluid sample stream with a sheathing ferrofluid such that the sheathing ferrofluid serves to further narrow the focused fluid sample stream of microparticles in the fluid sample;

flowing the focused fluid sample stream of microparticles through a substantially symmetric magnetic field such that the substantially symmetric magnetic field hydrodynamically causes microparticles flowing in the focused fluid sample stream to move relative to a center of the stream as a function of the size of the microparticles, such that larger microparticles are deflected further away from the center of the stream than smaller microparticles; and collecting separated microparticles in groups based on location of the microparticles relative to the center of the stream.

The features of the method of aspect 24 can be implemented with any of the devices of aspects 1-12 and/or 23 above, and with any of the kits of aspects 12-16.

Additional details regarding the devices, kits, and methods, of the present disclosure are provided in the Examples below. The specific examples below are to be construed as merely illustrative, and not limitative of the remainder of the disclosure in any way whatsoever. Without further elaboration, it is believed that one skilled in the art can, based on the description herein, utilize the present disclosure to its fullest extent.

It should be emphasized that the embodiments of the present disclosure, particularly, any "preferred" embodiments, are merely possible examples of the implementations, merely set forth for a clear understanding of the principles of the disclosure. Many variations and modifications may be made to the above-described embodiment(s) of the disclosure without departing substantially from the spirit and principles of the disclosure. All such modifications and variations are intended to be included herein within the scope of this disclosure, and protected by the following claims.

The following examples are put forth so as to provide those of ordinary skill in the art with a complete disclosure and description of how to perform the methods and use the compositions and compounds disclosed herein. Efforts have been made to ensure accuracy with respect to numbers (e.g., amounts, temperature, etc.), but some errors and deviations should be accounted for. Unless indicated otherwise, parts are parts by weight, temperature is in ° C., and pressure is at or near atmospheric. Standard temperature and pressure are defined as 20° C. and 1 atmosphere.

It should be noted that ratios, concentrations, amounts, and other numerical data may be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1% to about 5%" should be interpreted to include not only the explicitly recited concentration of about 0.1 wt % to about 5 wt %, but also include individual concentrations (e.g., 1%, 2%, 3%, and 4%) and the sub-ranges (e.g., 0.5%, 1.1%, 2.2%, 3.3%, and 4.4%) within the indicated range. Where the stated range includes one or both of the limits, ranges excluding either or both of those included limits are also included in the disclosure, e.g. the phrase "x to y" includes the range from 'x' to 'y' as well as the range greater than 'x' and less than 'y'. The range can also be expressed as an upper limit, e.g. 'about x, y, z, or less' and should be interpreted to include the specific ranges of 'about x', 'about y', and 'about z' as well as the ranges of 'less than x', less than y', and 'less than z'. Likewise, the phrase 'about x, y, z, or greater' should be interpreted to include the specific ranges of 'about x', 'about y', and 'about z' as well as the ranges of 'greater than x', greater than y', and 'greater than z'. In some embodiments, the term "about" can include traditional rounding according to significant figures of the numerical value. In addition, the phrase "about 'x' to 'y'", where 'x' and 'y' are numerical values, includes "about 'x' to about 'y'".

EXAMPLES

Now having described the embodiments of the disclosure, in general, the included examples and figures describe some additional embodiments. While embodiments of the present disclosure are described in connection with the example and the corresponding text and figures, there is no intent to limit embodiments of the disclosure to these descriptions. On the contrary, the intent is to cover all alternatives, modifications, and equivalents included within the spirit and scope of embodiments of the present disclosure.

Example 1

Introduction

The present example describes the design and testing of an embodiment of an ultrahigh-throughput microfluidic technology of the present disclosure, referred to in this example as inertial-ferrohydrodynamic cell separation (inertial-FCS), that rapidly sorted through over 60 milliliters of samples at a 100,000 cells/second throughput in a label-free manner, differentiating the cells based on their physical diameter difference with ~1-2 μm separation resolution. Through the integration of inertial focusing and ferrohydrodynamic separation, it was demonstrated that the resulting inertial-FCS devices could separate viable and expandable circulating tumor cells from cancer patients' blood with high recovery rate and high purity. This example also shows that the devices could enrich lymphocytes directly from white blood cells based on their physical morphology without any labeling steps. This label-free method could address needs of high throughput and high-resolution cell separation in circulating tumor cell research and adoptive cell transfer immunotherapy.

These above-mentioned challenges in currently available methods highlighted a need for a high-throughput and high resolution method that can separate target cells from a large volume of biological samples in a low-cost manner. To address this need, devices and methods of the present disclosure were developed, and example embodiments described here provide a label-free inertial-ferrohydrodynamic cell separation (inertial-FCS) method that was based on the integration of inertial focusing and ferrohydrodynamic separation of cells according to their physical diameters. This demonstrated separation of target cells from contaminating cells with a high throughput of ~$10^5$ cells/s, a high sample processing flow rate (~60 mL/h) and a high separation resolution of ~1-2 μm in cellular diameter difference. Due to its label-free nature, this method didn't require the use of antibodies and magnetic beads and could lower the cost of cell separations. This example illustrates the working principle of the inertial-ferrohydrodynamic cell separation (inertial-FCS) approach, the design and optimization of an example device for high-throughput and high-resolution cell separation, and the validation of the device using spiked cancer cells, blood samples from cancer patients, and human white blood cells.

Results and Discussion

Overview of Inertial-Ferrohydrodynamic Cell Separation

The underlying working principle of inertial-ferrohydrodynamic cell separation (inertial-FCS) was the integration of the inertial focusing and ferrohydrodynamic separation of cells of interests based on their physical diameters (FIG. 1A). In order to achieve a high throughput and high resolution separation of cells, an inertial focusing principle was first used to order cells into narrow streams in sigmoidal microchannels with alternating curvatures in the first stage of the inertial-FCS device (FIG. 1A). Cells were inertially focused prior to their separation. In this stage, the channel Reynolds number ($R_c$) was estimated to be 68.3, the particle Reynolds number ($R_p$) was 1.3 when the sample flow rate was 60 mL $h^{-1}$ (see supplementary information for Reynolds number calculation). The combination of the channel design and flow parameters in this stage enabled the cells in the sample to experience both inertial lift and Dean drag that forced them to migrate to balanced locations within the curved channel in the first stage (FIG. 1C).[28-30] In the second stage of the device, the inertially focused cell streams were ferrohydrodynamically separated into different spatial locations based on their physical diameters. The principle of ferrohydrodynamic cell separation in a biocompatible ferrofluid is illustrated in FIG. 1B. Cells immersed in a custom-made biocompatible ferrofluid, which is a uniformly magnetic media including colloidally stable maghemite nanoparticles, possessed an induced imaginary magnetic dipole moment in a non-uniform magnetic field, which in turn generated a cell volume-dependent magnetic body force, also referred to as magnetic buoyancy force that drove the cells away from the magnetic field maxima.[31-36] Forces on the cells can therefore separate them based on their physical diameters in a continuous ferrofluid flow. Through the integration of both inertial focusing and ferrohydrodynamic separation, a high sample flow rate (~60 mL/h) and a high cell processing throughput (~$10^5$ cells/s) separation was achieved while being able to differentiate cells with a diameter difference of ~1-2 μm in two separate validations.

Optimization of Inertial-Ferrohydrodynamic Cell Separation

First, the inertial-ferrohydrodynamic cell separation (inertial-FCS) device was optimized for a high cell-processing throughput separation of target cells. The throughput performance targets of the inertial-FCS device in cell separation included: (1) a cell-processing throughput of ~$10^5$ cells per second, and a sample processing flow rate of >60 mL per hour, and (2) a high recovery and purity of separated cells. These performance metrics were chosen after considering separation requirement on the samples that contained cancer cells or lymphocytes, as well as the challenges facing existing cell separation methods (see supplementary information).[16-27]

Figure 1E:
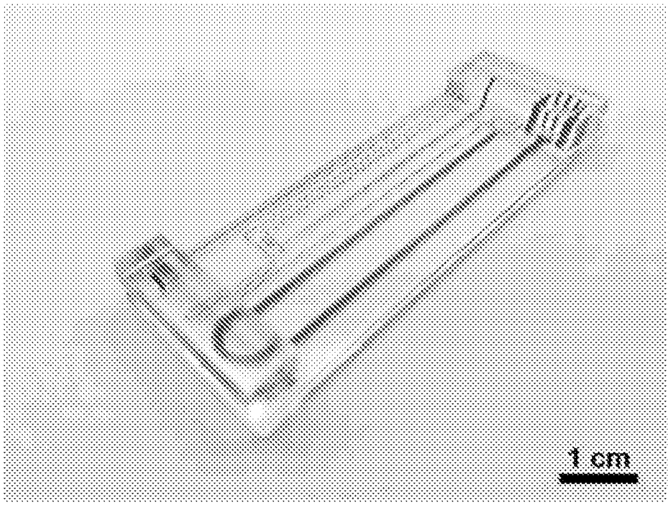
FIG. 1E shows a photo of an example inertial-FCS microchannel according to various embodiments described herein.

Systematic optimization of high-throughput inertial-FCS devices focused on the effects of device geometry, magnetic field and its gradient, sample flow rates, as well as ferrofluid concentration on device performance, including cell-processing throughput, recovery rate and purity of separated cells. This optimization was conducted using a previously developed physical model that took into consideration of the balanced magnetic buoyance force and hydrodynamic viscous force on cells in laminar low conditions.[37,38] Firstly, the microchannel dimensions were determined for both inertial focusing and ferrohydrodynamic separation stages by balancing a goal of processing at least 60 milliliters of samples within one hour, and a goal to achieve inertial focusing of cells in the sigmoidal microchannels with alternating curvatures. Inertial focusing channel dimensions were optimized so that the channel Reynold's number ($R_c$) was 63.8 and the particle Reynold's number ($R_p$) was 1.3 when the flow rate was 1000 μL $min^{-1}$ or 60 mL $h^{-1}$, ensuring that the cells would experience inertial focusing and self-organize into narrow streams prior to the separation.[28] The schematic and prototype microchannel of an inertial-FCS device are shown in FIGS. 1D and 1E.

Figure 2B:
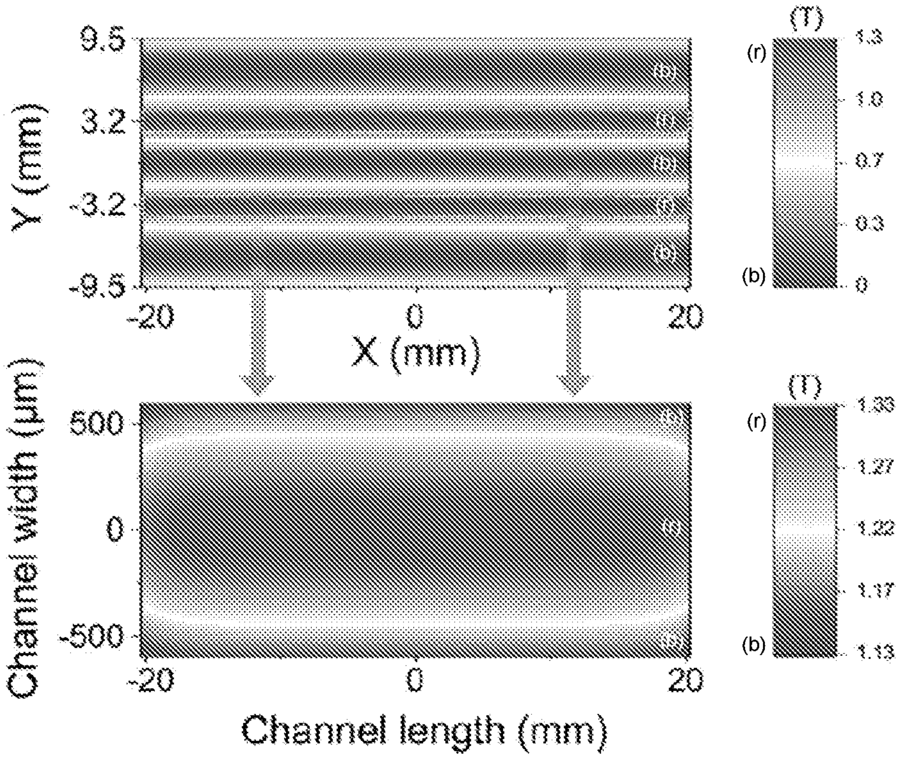
FIG. 2B illustrates an example distribution of the magnetic flux density in the separation microchannel according to various embodiments described herein.
Figure 2C:
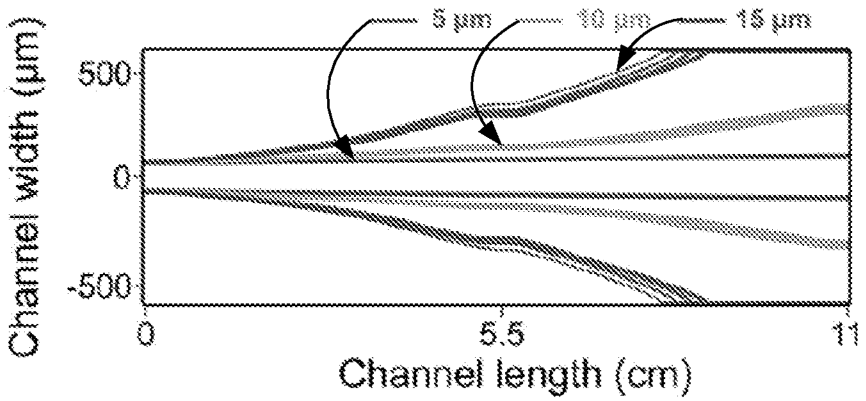
FIG. 2C illustrates simulated particle trajectories in the inertial-FCS device in the x-y plane according to various embodiments described herein.

Secondly, the generation of external magnetic field gradient was optimized because the amplitude of magnetic force on cells was proportional to the amplitude of magnetic field gradient.[31-36] In order to maximize the field gradient, a sextupole magnet configuration was adopted in the inertial-FCS device that could generate a magnetic flux density in the range of 0-3.2 T (1.1-1.3 T within the separation microchannel), and a magnetic flux density gradient up to 670 T $m^{-1}$ (FIG. 2A). The microchannel and the sextupole magnets were placed in such a way that the magnetic flux density was highest at the center of the channel in the y-direction (see FIG. 2 for coordinates), and had a symmetric distribution (FIG. 2B). The purpose of such configuration was to ferrohydrodynamically drive the inertially focused cells away from the center of the channel (y-direction) for diameter-dependent spatial separation. The migration distance of the cells in the y-direction depended on their physical diameter: cells with a larger diameter migrated more, leading to a spatial separation of cells (FIG. 2C).

The remaining optimization focused on the effect of ferrofluid concentration (volumetric fraction of magnetic materials in the ferrofluid) and cell-processing sample flow rate on the performance of the ferrohydrodynamic separation stage. For this part of optimization, an output was calculated—a separation distance in the y-direction between cells with different diameters, denoted as ΔY. ΔY was optimized using parameters including ferrofluid concentration (0-0.3% v/v) and sample flow rate (100-1200 μL $min^{-1}$, i.e., 6-72 mL $h^{-1}$). The goal was to maximize the separation distance while achieving the highest sample flow rate simultaneously. We first optimized the flow ratio between the sample flow and the sheath flow to be 2 when the sample flow rate was 600-1200 μL $min^{-1}$ through simulation (FIG. 3A). This optimized flow ratio allowed control of the locations of the cells immediately after their inertial focusing so that maximal separation between the cells could be achieved (see Example 2). The dependence of separation distance ΔY on the ferrofluid concentrations and the sample flow rates in FIGS. 3B and 3C were then determined through both simulations and experiments. The simulation results showed that for a specific sample flow rate, there existed a corresponding optimal ferrofluid concentration that led to maximal separation distance between cells. This dependence was experimentally verified in FIGS. 3D and 3E using a mixture of 6 μm and 10 μm (diameters) diamagnetic particles in an inertial-FCS device. Experimental data and simulations followed the same trend (FIGS. 3B and 3C). The optimization of inertial-FCS device provided a collection of optimized operating parameters including sample flow rate and ferrofluid concentration for cell separation applications. For the specific cell separations reported later in this example (CTCs and T lymphocytes), the following parameters were chosen to maximize the sample processing throughput while reduce the usage of ferrofluids: 0.05% (v/v) ferrofluid concentration and 1,000-1,200 μL $min^{-1}$ (60-72 mL $h^{-1}$) flow rate.

Optimization of Inertial-Ferrohydrodynamic Cell Separation for High Separation Resolution The inertial-ferrohydrodynamic cell separation (inertial-FCS) device was next optimized for a high-resolution separation of target cells. The aim was to use the inertial-FCS device to separate cells that had ~1-2 μm difference in their physical diameters. Being able to differentiate cells with such a small diameter difference allowed the device to selectively enrich target cells from contaminating cells that had similar physical morphologies. For this purpose, it was first investigated the theoretical separation resolution of the inertial-FCS device through simulations, by considering realistic biological samples containing cells with polydisperse physical diameters. The separation distance between particles that had just 1 μm in their diameter difference was obtained, denoted as $\Delta Y_{1\ \mu m}$, and its dependence on the particle diameter and sample flow rates through simulation in FIG. 4A. The concentration of the ferrofluids was constant at 0.05% (v/v) in this simulation. The separation distance between cells $\Delta Y_{1\ \mu m}$ was chosen to be larger than 100 μm as the criterion for a complete separation, because particle streams had finite width even after inertial focusing, and a 100 μm center-to-center distance between particle streams was sufficient for separation based on experimental observations.

A major observation from this simulation study (FIG. 4A) was: for particles with a given physical diameter, optimized sample flow rate leading to a complete separation ($\Delta Y_{1\ \mu m}$>100 μm) between these particles and smaller/larger particles (1 μm difference in their diameter) depended on the particle diameter. Smaller particles (<10 μm in diameter) separated from each other better at lower flow rates, while particles of 10-20 μm in diameter separated more effectively at larger flow rates. This observation was because as the particle diameter increased, their volume difference decreased, which made the volume-dependent inertial-FCS method less effective in separating them. Even at high flow rates, the small volume difference between large particles (10-20 μm in diameter, 1 μm in diameter difference) could barely be differentiated by the ferrohydrodynamic force. This finding here was validated using fluorescent diamagnetic particles that had well-defined diameters (FIG. 4B), where mixtures of 5 μm and 6 μm, 6 μm and 7 μm diamagnetic particles were shown to be completely separated at the end of the device using optimized flow rates. It was concluded that the theoretical separation resolution limit of the inertial-FCS device in particle separation was 1 μm in diameter difference for particles of <10 μm in diameter.

For particles of 10-20 μm in diameter, the separation resolution was relaxed to 2 μm in their diameter difference in order to achieve sufficient separation distance and high sample flow rates. FIG. 4C showed the separation distance $\Delta Y_{2\ \mu m}$ (separation distance between cells that had 2 μm in their diameter difference), and its dependence on the cell diameter and sample flow rates. The concentration of the ferrofluids was constant at 0.05% (v/v) in this simulation. It was noted that a larger separation distance and a higher sample rate could be achieved when separating ($\Delta Y_{2\ \mu m}$>100 μm) these particles. Experimentally, this finding was verified by challenging the device with mixtures that consisted of diamagnetic particles with multiple diameters that were close to each other (diameters: 6, 8, 10 and 15 μm). FIGS. 4D and 4F showed that these particles were completely separated from each other at very high flow rates (800-1200

μL $min^{-1}$, or 48-72 mL $h^{-1}$) at the end of the device. It was concluded that the theoretical separation resolution limit of the inertial-FCS device was 2 μm in diameter difference for particles of 10-20 μm in diameter. Both optimization with a constant 0.05% (v/v) ferrofluid concentration in FIGS. 4A and 4C indicated that the separation were efficient for particles with diameters less than 20 μm, but less efficient for particles with even larger diameters ($\Delta Y_{1\ \mu m}$ and $\Delta Y_{2\ \mu m}$<~100 μm).

To search for parameters that worked efficiently for particles of >20 μm in diameter, the separation distance ($\Delta Y_{2\ \mu m}$)'s dependence on the ferrofluid concentration was simulated at a constant sample flow rate (1,500 μL $min^{-1}$). FIG. 4E indicated that ferrofluid concentration tuning would allow optimized separation between particles with relatively large diameters. These simulational and experimental studies on the separation resolution of the inertial-FCS device, together with the studies conducted in the previous section, allowed determination of optimized sample flow rates, ferrofluid concentration and magnetic field pattern to achieve high-throughput and high-resolution for specific cell separation challenges discussed below.

Validation of Inertial-Ferrohydrodynamic Cell Separation with Biological Samples After the completion of the inertial-FCS optimizations, the devices were verified in two cell separation applications. The first application was the use of the device in recovering circulating tumor cells from lysed whole blood. The second application was the use of the device in separating lymphocytes from human white blood cells. Due to the large volume of samples and the large quantity of cells, as well as the physical diameter distribution of cells in these samples, we chose sample flow rates of 1,000-1,200 μL $min^{-1}$ (60-72 mL $h^{-1}$) and a ferrofluid concentration of 0.05% (v/v) in the inertial-FCS device to achieve high throughput and high separation resolution.

Initially, the spiked cancer cell validation was conducted with the aim of using inertial-FCS devices to recover CTCs from cancer patients' blood. Most CTCs of epithelial origin had a diameter range of 15 μm-25 μm, and were on average larger than other blood components such as red blood cells (RBCs: 6-9 μm in diameter), and the majority of white blood cells (WBCs: 8-14 μm in diameter).[1] However, measurements on the cell diameter of cancer cell lines and WBCs showed that there was a significant diameter overlap between WBCs and cancer cells.[39]. There was also a significant percentage of patient-derived CTCs that were smaller than 10 μm in diameter.[39] Because of the polydispersity in the cancer cells' diameter, label-free cancer cell separation methods for CTC applications needed to have a high separation resolution, preferably ~1-2 μm so that target cells could be precisely separated based on their physical diameter while the contamination was minimized. The spiked cancer cell validation demonstrated that the inertial-FCS device could separate cancer cells with a resolution of ~2 μm, which led to a high recovery rate and purity of isolated cells.

Figure 5A:
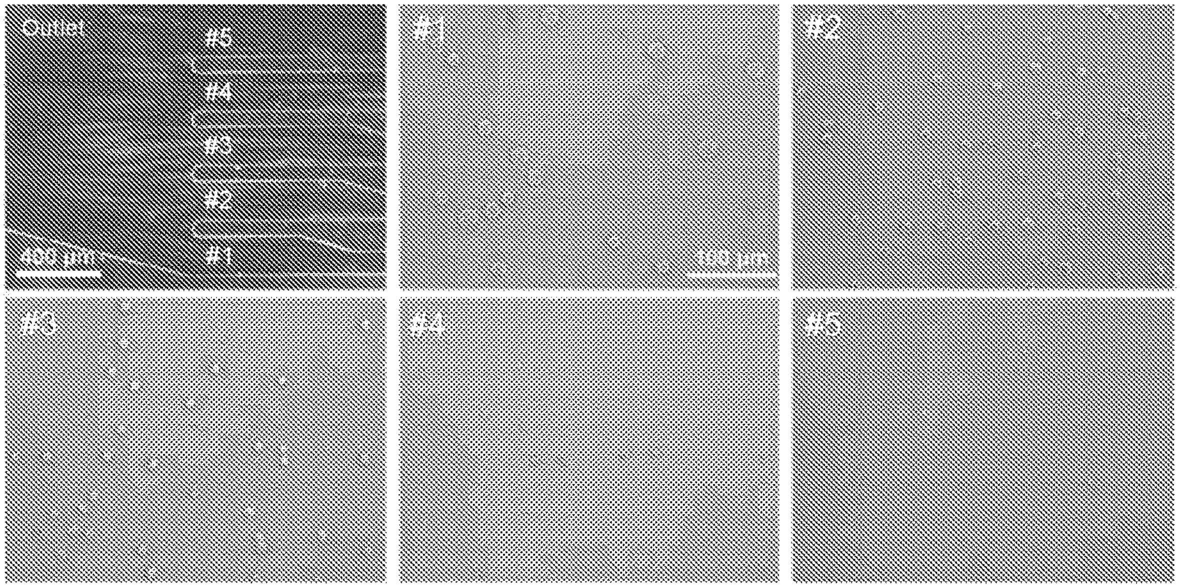
FIG. 5A illustrates example bright field images of the separation of H1299 cancer cells based on their physical diameters at the outlets of the inertial-FCS device according to various embodiments described herein.
Figure 5B:
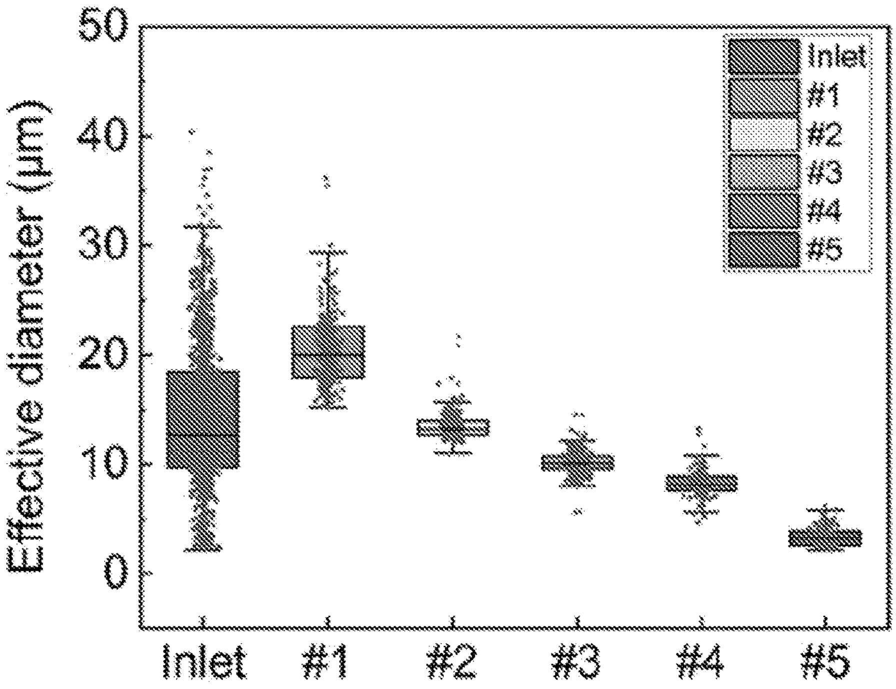
FIG. 5B illustrates an example of distribution of effective diameters of H1299 cancer cells measured before and after the separation for the example shown in FIG. 5A according to various embodiments described herein.

The inertial-FCS device was then used to separate a non-small lung cancer cell line (H1299) based on their physical diameters. A typical separation process can be visualized in FIG. 5A, in which H1299 lung cancer cells (cell diameter range 3-41 μm) were spiked into 10 mL of ferrofluids (0.05% v/v) and processed in an inertial-FCS device at a flow rate of 72 mL $h^{-1}$. Cells collected from the outlets of the device showed different mean diameters (FIG. 5B). While the unseparated H1299 cells had a diameter distribution of 14.08±6.47 μm, cells from outlets #1-5 showed much less polydispersity (outlet #1: 20.54±3.34 μm, outlet #2: 13.49±1.23 μm, outlet #3: 10.13±0.99 μm, outlet #4: 8.22±1.26 μm, outlet 5: 3.40±0.92 μm). This confirmed that the inertial-FCS device could separate cancer cells based on their physical diameter and the minimal resolution of the separation was 1.9 μm (between the cells collected from outlets #3 and #4, supplementary information). The validation continued by testing the device with spiked cancer cells in lysed whole blood.

Figure 5C:
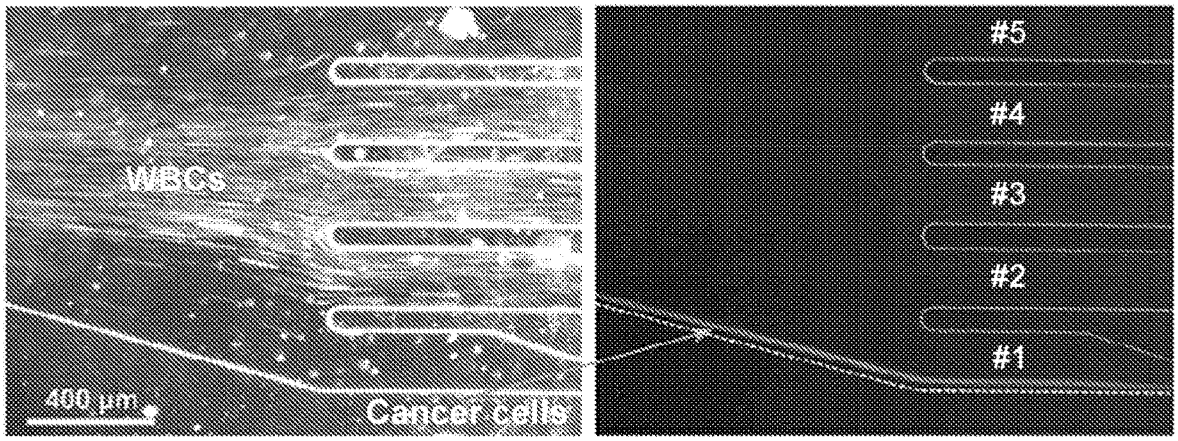
FIG. 5C illustrates an example of a separation of spiked H1299 cancer cells from human white blood cells according to various embodiments described herein.

A typical separation process can be visualized in FIG. 5C (end of the inertial-FCS device), in which green fluorescently stained H1299 lung cancer cells were spiked into 1 mL of WBCs and processed in a device at a flow rate of 60 mL $h^{-1}$. The total sample volume was 10 mL and the total number of cells (including cancer cells and WBCs) was ~60 million. The corresponding throughput of the inertial-FCS device for processing these cells was ~100,000 cells/s. The cells that exited from outlet #1 were chosen to be the collected cells. It was predicted that cells with a mean physical diameter of 20.54 μm exited via the outlet #1. This group of cells would include cancer cells as well as large WBCs. FIG. 5C showed that green fluorescent H1299 cells exited predominately through outlet #1. A post-separation analysis of cells from outlet #1 yielded a recovery rate of spiked H1299 cancer cells of 97.2±4.0%, and a purity of cancer cells of 9.2±1.1%, at a spike ratio of ~100 cancer cells per one milliliter of blood. The validation was extended to three more cancer cell lines.

Figure 5D:
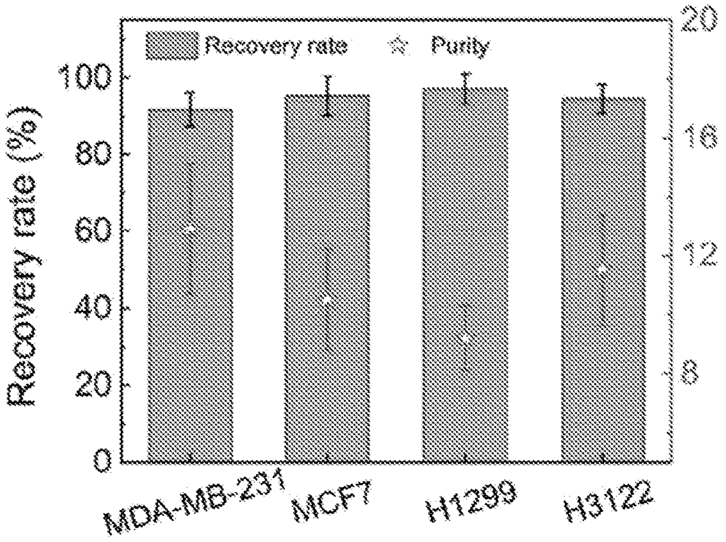
FIG. 5D illustrates a recovery rate and purity of separated cancer cells according to various embodiments described herein.
Figure 5E:
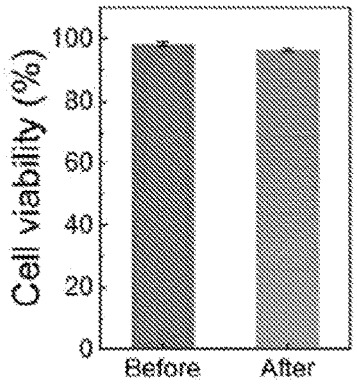
FIG. 5E illustrates an example of a short-term H1299 cancer cell viability comparison before and after the inertial-FCS device processing according to various embodiments described herein.
Figure 5F:
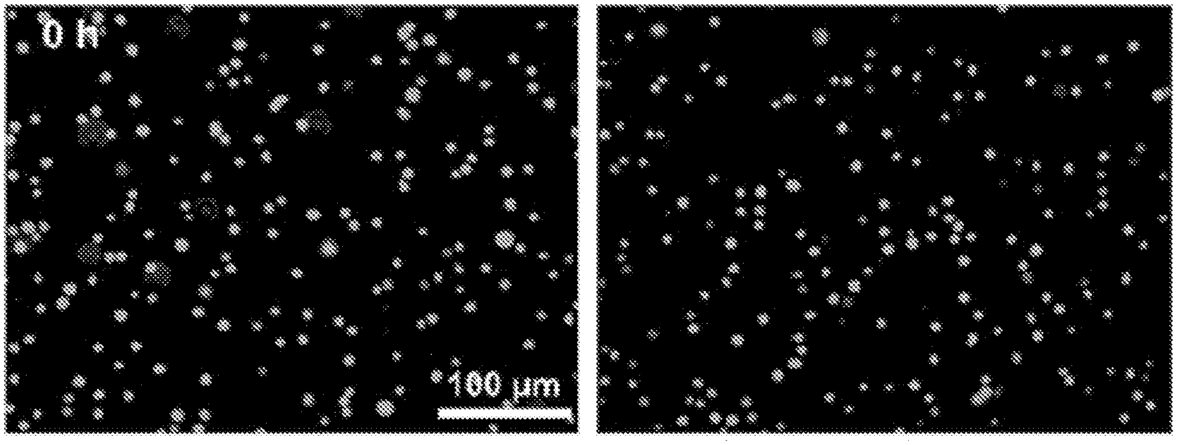
FIG. 5F illustrates example fluorescence images of a live/dead assay immediately after H1299 cancer cell separation according to various embodiments described herein.
Figure 5G:
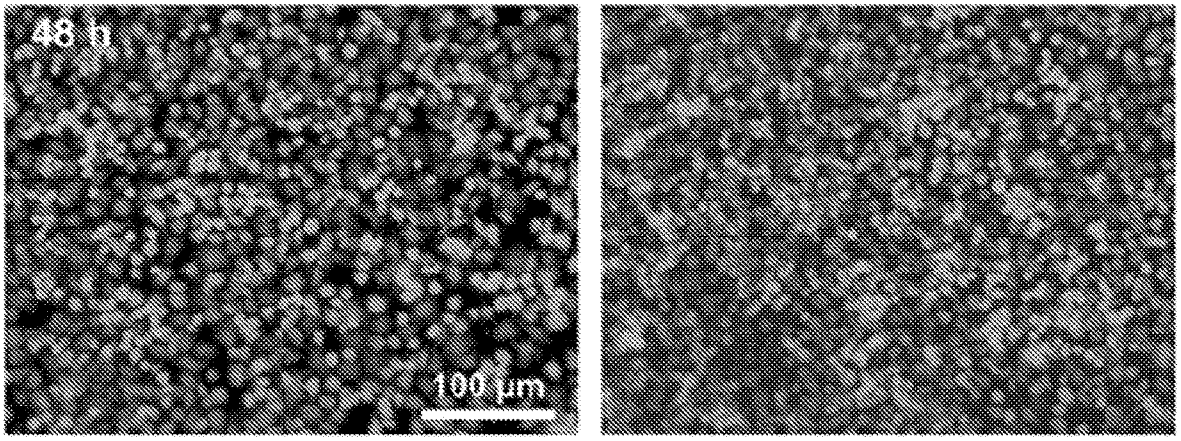
FIG. 5G illustrates representative images of cultured H1299 lung cancer cells after inertial-FCS device processing at 48 hours according to various embodiments described herein.

As shown in FIG. 5D, by using inertial-FCS method, recovery rates of 91.8±4.3%, 95.4±5.1%, and 94.6±3.1% were obtained for MDA-MB-231 (breast cancer cell line), MCF7 (breast cancer cell line) and H3122 (non-small cell lung cancer cell line), respectively. The average recovery rate across four cancer cell lines was 94.8%. Average purities of the recovered cancer cells across four cancer cell lines was 11.0%. The impact of the inertial-FCS process and the biocompatible ferrofluids on cells was also studied. Short-term cell viability, long-term cell proliferation, and morphological changes of cancer cells following the separation process were examined. As shown in FIG. 5E, cell viability of H1299 cells before and after separation were determined to be 98.3% and 96.2%, respectively, indicating a negligible decrease in cell viability. Representative fluorescence images of cells are shown in FIG. 5F. FIG. 5G shows the images of separated H1299 cells after 48 hours. They were able to proliferate to confluence and maintain the morphology after the separation process. We also compared the morphologies of cells before and after the inertial-FCS process and observed minimal changes (see supplementary information). In this validation, we demonstrated inertial-FCS's ability of high-throughput, high-resolution and biocompatible recovery of spiked cancer cells from human white blood cells.

The inertial-FCS device was then validate using a blood sample from four stage IIIB/IV lung cancer patients. The patients were recruited and consented from the University Cancer and Blood Center (Athens, Georgia) under an approved IRB protocol (University of Georgia, VERSION00000869). Blood was drawn from the patients prior to any cancer related treatment and processed by inertial-FCS devices for CTC separation. After separation, isolated cells were divided for cell identification and cell culture. Cells in the identification portion were stained with the epithelial marker (EpCAM), mesenchymal markers (vimentin and N-cadherin), leukocyte marker (CD45) and nucleus staining DAPI for their identification. CTCs were identified as epithelial positive (EpCAM+/CD45−/DAPI+), mesenchymal positive (Vim+/CD45−/DAPI+, N-cad+/CD45−/DAPI+ or Vim+/N-cad+/CD45−/DAPI+), or both epithelial and mesenchymal positive (EpCAM+/Vim+/N-cad+/CD45−/DAPI+), while WBCs were identified as CK−/Vim−/N-cad−/CD45+/DAPI+. The numbers of identified CTCs for all patients are listed in Example 2 below.

Figure 5H:
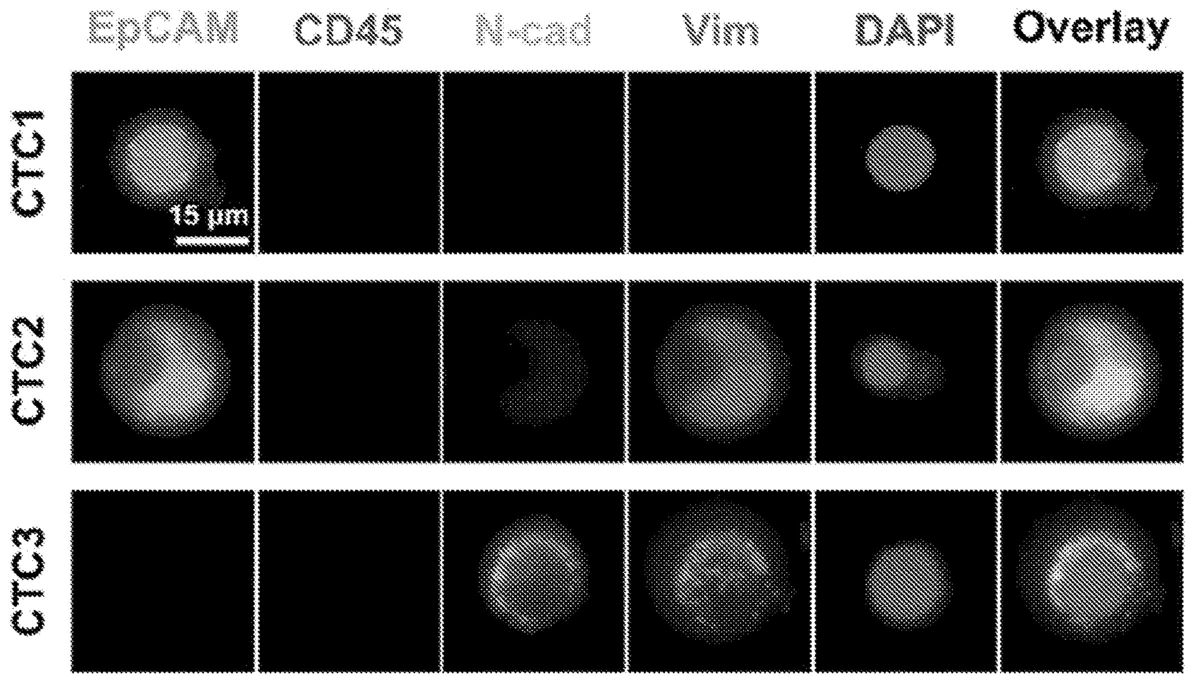
FIG. 5H illustrates immunofluorescence images of 3 individual CTCs enriched from one stage IV non-small cell lung cancer patient according to various embodiments described herein.
Figure 5I:
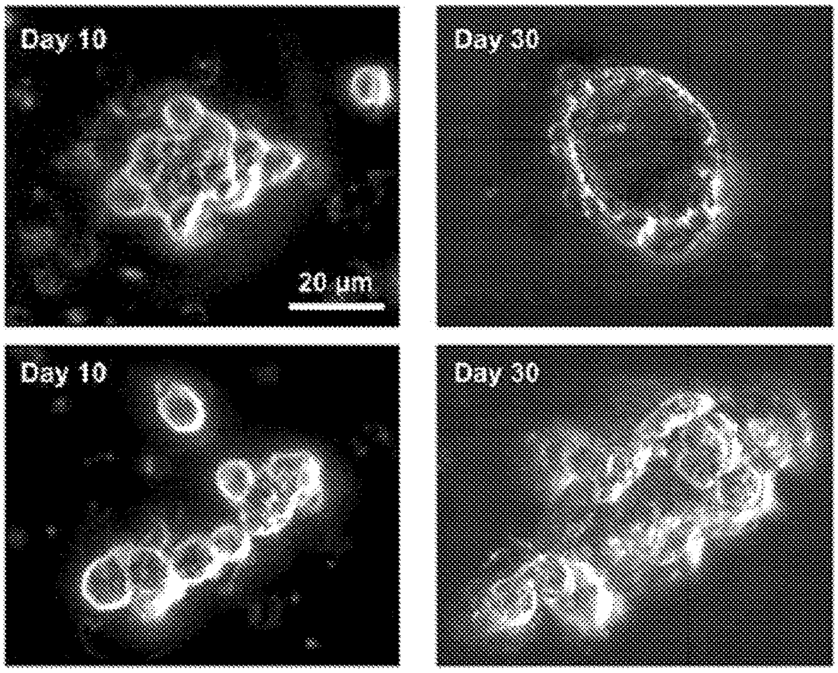
FIG. 5I illustrates bright field images of cultured cells at day 10 and day 30.

For patient 1, a total of 1452 CTCs were separated from 10 mL of blood from this patient (145 CTCs per mL of blood). Examples of intact CTCs from device outputs are shown in FIG. 5H. Because inertial-FCS allowed maintenance of cell viability and proliferation after separation, culturing CTCs after separation was also attempted for this patient. In the CTC culturing protocol, isolated cells in the culture portion were cultured in DMEM/F12 medium supplemented with B27 supplement, epidermal growth factor, basic fibroblast growth factor, L-Glutamine, and Penicillin-Streptomycin, over a 30-day period. FIG. 5I shows the images of cell clusters at day 10 and 30 of culture. Isolated CTCs remained viable and formed CTC clusters, suggesting that the inertial-FCS devices could potentially isolate viable and expandable CTCs from cancer patients' blood samples. The purities of the CTCs isolated from two patients' samples (Patient 3 and 4, supplementary information) were 11.70% and 36.39%.

Figure 6A:
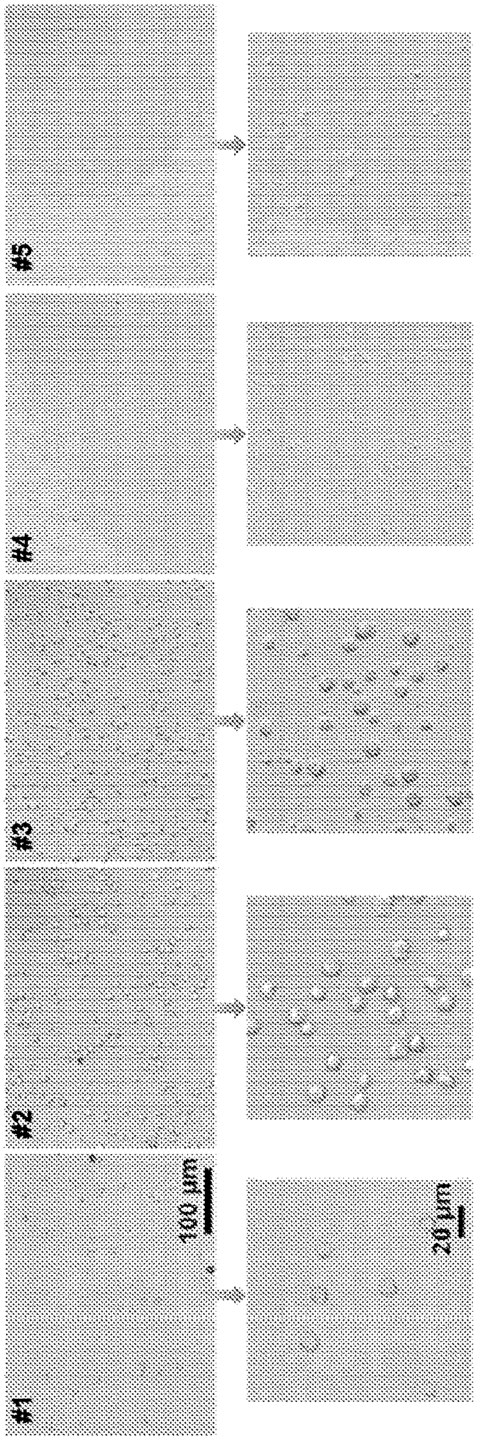
FIG. 6A illustrates example bright field images of the separation of white blood cells based on their physical diameters at the outlets of the inertial-FCS device according to various embodiments described herein.
Figure 6B:
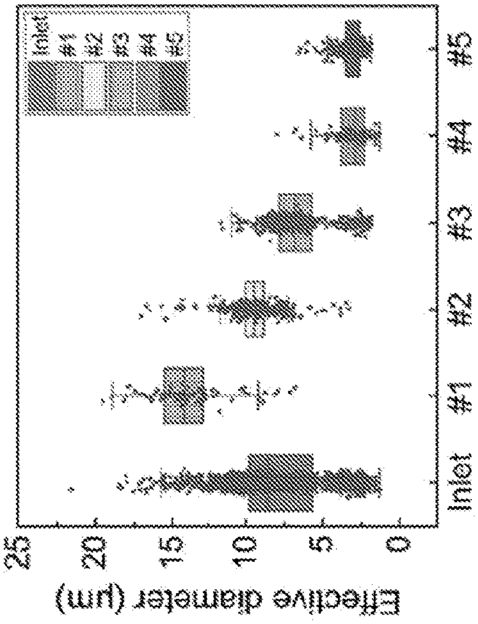
FIG. 6B illustrates an example distribution of effective diameters of cells collected from the inlet (before separation) and outlets (after separation). according to various embodiments described herein.

Next, lymphocyte validation was conducted with the aim of using inertial-FCS devices to purify lymphocytes from white blood cells. Lymphocytes consisted of B and T cells, which were 6-8 μm in diameter, and larger natural killer cells, which were 12-15 μm in diameter.[40] These lymphocytes co-exited with a large quantity of granulocytes that were 10-15 μm in diameter, and monocytes that were 15-30 μm in diameter.[40] The inertial-FCS device was used to separate the lymphocytes from other white blood cells. In this validation, 10 mL lysed human blood with ~60 millions of WBCs was suspended in a 0.05% (v/v) ferrofluid and processed in the device with a flow rate of 1,000 μL $\text{min}^{-1}$ (60 mL $\text{h}^{-1}$) and a corresponding throughput of ~100,000 cells/s. After separation, the diameter distributions of cells collected from the device inlet and outlets #1-5 were examined. FIGS. 6A and 6B showed that cells from the outlets were significantly less polydisperse than the cells in the inlet (inlet: 7.80±3.14 μm, outlet #1: 13.85±2.67 μm, outlet #2: 9.43±1.62 μm, outlet #3: 6.39±2.12 μm, outlet #4: 3.15±1.27 μm, and outlet #5: 3.16±0.77 μm).

Figure 6C:
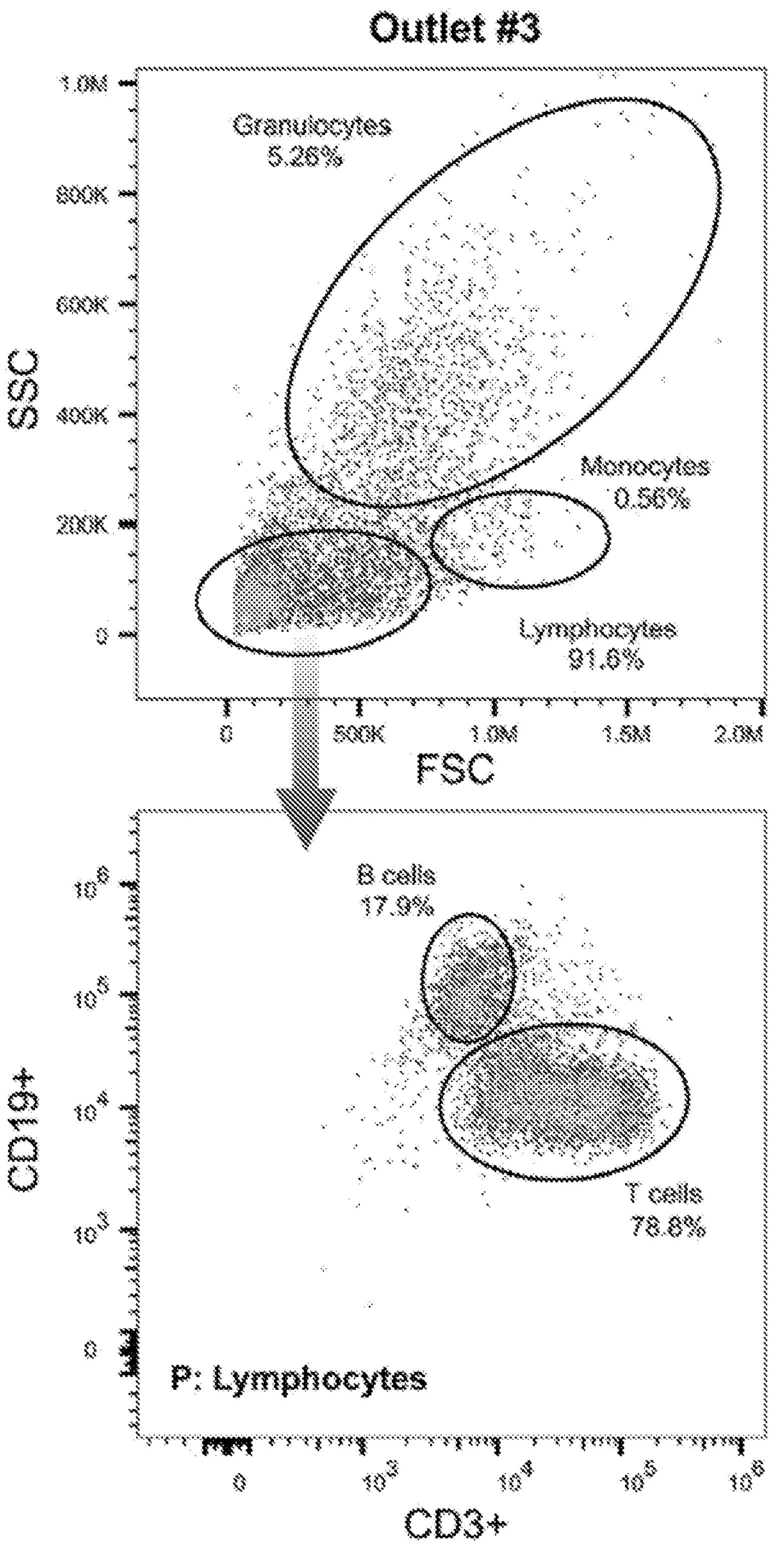
FIG. 6C illustrates an example of flow cytometry results of cells collected from outlet #3 according to various embodiments described herein.
Figure 6D:
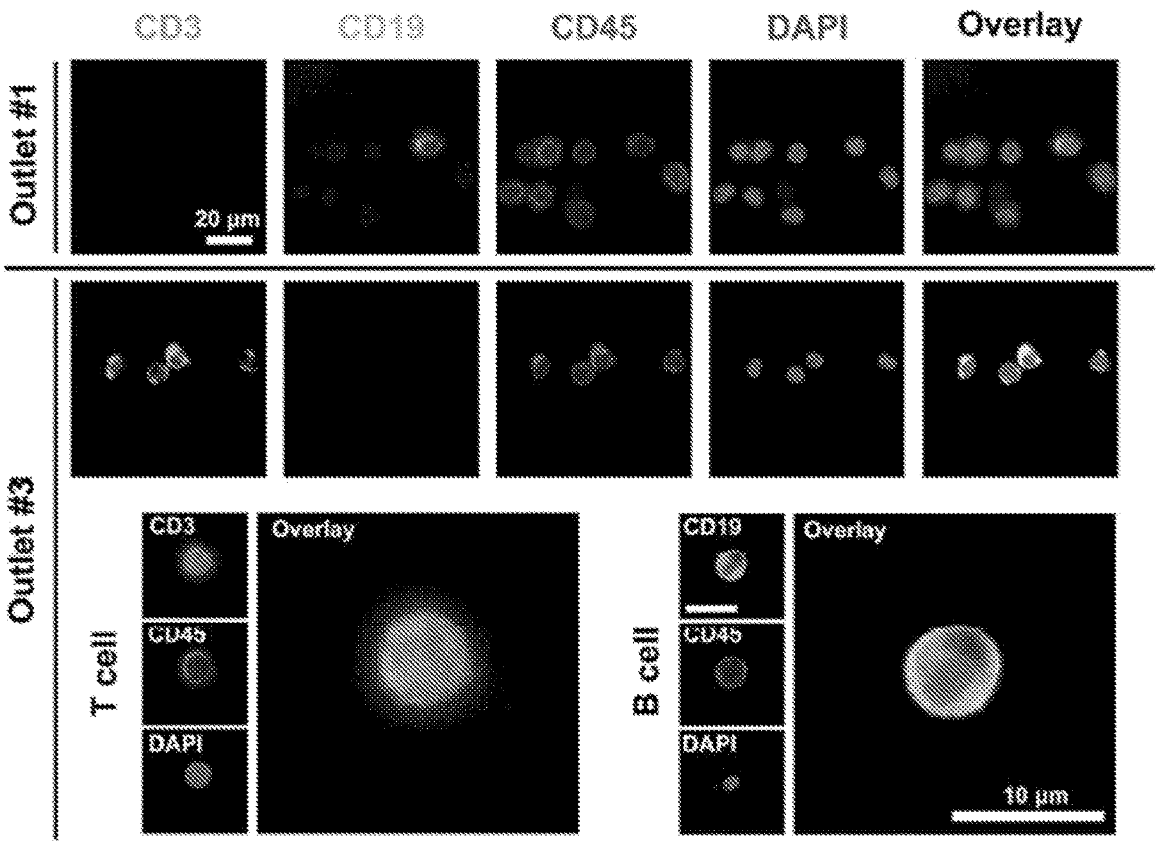
FIG. 6D illustrates example immunofluorescence images of cells collected from outlets #1 and #3 according to various embodiments described herein.
Figure 6E:
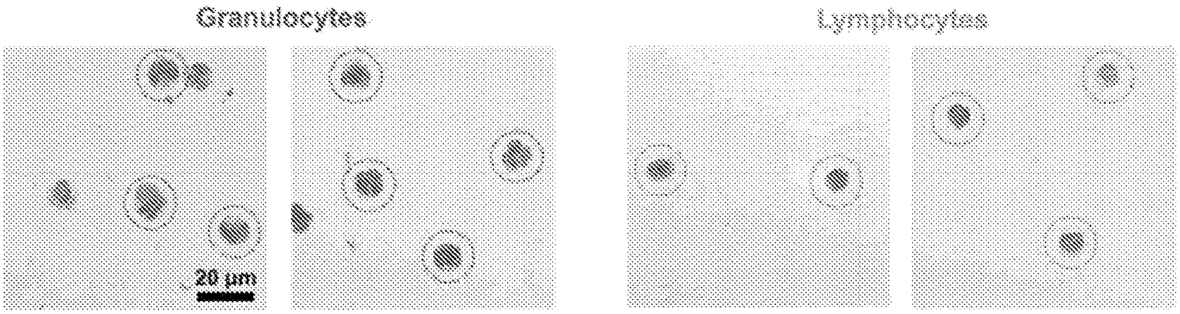
FIG. 6E illustrates example of Wright's staining of cells from outlets #1 and #3 according to various embodiments described herein.

It was also observed that the platelets with the diameter of 2-3 μm were present in outlets #2-5, due to the fact that the inertial focusing stage was less effective in focusing small cells such as platelets (see supplementary information). The cells from the outlet #3, which had a diameter distribution of 6.39±2.12 μm, were collected and analyzed because this diameter distribution coincided with the lymphocyte diameter (6-8 μm) reported in the literature.[23,40]. The analyses of these cells included flow cytometry for the cell composition, immunofluorescent and hematologic stains for cell differentiation (FIGS. 6C, 6D and 6E). From the flow cytometry analysis in FIG. 6C, the cells from the outlet #3 were found to include primarily lymphocytes with a small percentage of granulocytes and monocytes (91.6% lymphocytes, 5.26% granulocytes and 0.56% of monocytes, FIG. 6C top panel). Lymphocytes were further revealed to have 78.8% T lymphocytes and 17.9% B lymphocytes (FIG. 6C bottom panel). From the immunofluorescent analysis in FIG. 6D the lymphocytes recovered from the outlet #3 of the device consisted of T lymphocytes (CD3+/CD45+/DAPI+) and B lymphocytes (CD19+/CD45+/DAPI+). Hematologic stain in FIG. 6E also confirmed the presence of lymphocytes in the outlet #3. In this validation, inertial-FCS's ability of high-throughput and high-resolution purification of lymphocytes directly from white blood cells in a label-free manner was demonstrated.

Conclusion

The data and results of this study demonstrate a label-free inertial-ferrohydrodynamic cell separation (inertial-FCS) method and device that integrated both inertial focusing and ferrohydrodynamic separation for cell separation based on their physical diameter difference. This method leveraged both the high throughput of the inertial focusing and high resolution of the ferrohydrodynamic separation to enable rapid and precise cell separations that were urgently needed in fundamental biological research and clinical assays. Systematic optimization of the inertial-FCS method was performed and operating parameters were determined that enabled it to process more than 60 mL of biological samples within one hour at an extremely high 100,000 cells/s throughput, a feature that was desired in a variety of biological applications that involve processing a large volume of biological samples to search for target cells.

The high resolution nature of this method allowed it to differentiate cells with ~1-2 μm in their physical diameter difference, a feature that was sought for label-free and low-cost cell separation applications, which often had polydispersed cells with overlapping physical sizes. The inertial-FCS devices could separate spiked cancer cells in a biocompatible manner from white blood cells with high throughput and high resolution. Isolated cancer cells showed a high recovery rate (94.8%) and a high purity (11%), which implied that this method could be used in enriching circulating tumor cells from cancer patients. This was confirmed by using inertial-FCS devices to process blood samples from stage IIIB/IV lung cancer patients. The inertial-FCS devices could also purify lymphocytes directly from white blood cells based on their physical diameters at an extremely high throughput, which could potentially lower the cost associated with adoptive cell transfer therapy because lymphocytes were precursors for potent therapeutic cells. Future optimization of the inertial-FCS method could potentially lead to devices that can process a single blood sample to simultaneously purify both circulating tumor cells and lymphocytes with non-overlapping size profiles.

DETAILED DESCRIPTION OF THE FIGURES

Shown in FIGS. 1A-1E is an overview of the inertial-ferrohydrodynamic cell separation (inertial-FCS) scheme and its device. In FIG. 1A, the working principle of the inertial-FCS is shown. Cells within a custom-made biocompatible ferrofluid were inertially focused into a narrow stream in curved microchannels in the first stage of the device (inertial focusing stage). This cell stream was then ferrohydrodynamically separated into multiple streams according to the cells' physical diameter in the second stage of the device (ferrohydrodynamic separation stage). The black arrow with gradient indicates the distribution of the magnetic field in the microchannel.

In FIG. 1B, an example schematic of a diamagnetic particle experiencing ferrohydrodynamic force in a colloidally-stable magnetic nanoparticle suspension (e.g., ferrofluids) is shown. The magnetization of the diamagnetic particle was near zero and much less than that of its surrounding ferrofluid. The ferrohydrodynamic force on the diamagnetic particles was generated from the pressure via nanoparticle collisions on the particle's surface, which was proportional to the particle volume, the magnetization of the ferrofluid, and the gradient of the magnetic field strength. The side gradient bar indicates the relative amplitude of the magnetic field strength. The red arrow shows the direction of the ferrohydrodynamic force that points away from the stronger magnetic field, and the small black arrows on the diamagnetic particle surface show the direction of interaction between magnetic nanoparticles and the diamagnetic particle.

In FIG. 1C, example images of the inertial-FCS channel in operation are shown. Red (6 μm in diameter) and green (10 μm in diameter) polystyrene beads were mixed in a ferrofluid and injected into the device to obtain these images. Shown in the images as numbered: (1) particles prior to inertial focusing (blended color); (2-4) particles after inertial focusing but before ferrohydrodynamic separation (still blended color); and (5-6) particles after ferrohydrodynamic separation (size of particles in stream is indicated on figures since color differentiation is not distinguishable in grayscale). The sample flow rate was 600 μL $min^{-1}$.

In FIG. 1D, an example top-view schematic drawing of the inertial-FCS device channel is shown. Cells were injected into the channel from inlet A. After going through a debris filter that removed large debris, cells were inertially focused in curved channels (labeled the inertial focusing stage). The sheath flow was injected into inlet B to further narrow the sample stream and control the starting points of cells. Cells were then ferrohydrodynamically separated based on their physical diameter. Separated cells were collected from the outlets for further analysis. FIG. 1E shows an example photo of the inertial-FCS microchannel.

Shown in FIGS. 2A-2C are example magnetic field optimization of the inertial-FCS device. In FIG. 2A, the sextupole magnet configuration in the inertial-FCS device generated a high magnetic flux density and its gradient sufficient for cell separation is shown. Using six permanent magnets (50.8 mm by 6.35 mm by 6.35 mm, N52 neodymium magnet) in a sextupole configuration shown here (top panel), a magnetic flux density of up to 1.4 T in the y-z plane (x=0) and a magnetic flux density gradient of >600 T $m^{-1}$ in the y-z plane (x=0) were generated (bottom panel). The dashed white lines in the top panel indicate the locations of the separation microchannel. The configuration of the magnets and the microchannel is shown here. For FIGS. 2A and 2B the red and blue coloring representing the magnetic flux density and its gradient are indicated on the figures with an (r) indicating red areas and a (b) indicating blue areas.

In FIG. 2B, the distribution of the magnetic flux density in the separation microchannel is shown. The highest magnetic flux density is located at the center of the microchannel in the x-y plane (z=0), and the distribution of the flux density is symmetric in the channel in the y-direction. This was chosen so that the cells in the channel would be driven ferrohydrodynamically from the center to the sides of the channel based on their physical diameter. The dashed white lines in the top panel indicate the locations of the separation microchannel.

In FIG. 2C, simulated particle (5 μm, 10 μm, and 15 μm diameter polystyrene beads) trajectories in the inertial-FCS device in the x-y plane show that these particles could be separated based on their diameters are shown. The sample flow rate was 1000 μL $min^{-1}$.

Shown in FIGS. 3A-3E are example optimizations of the inertial-FCS device for high throughput with parameters including the sample/sheath flow ratio, ferrofluid concentration and sample flow rate. In FIG. 3A, dependence of the diamagnetic particle separation distance (ΔY) on the sample flow rate and the ratio between the sample and sheath flow is shown. A flow ratio of 2 was chosen to be able to maintain both the high sample flow rate (~1000 μL $min^{-1}$) and large separation distance (ΔY) between 6 μm and 10 μm (diameters) diamagnetic particles.

In FIG. 3B, dependence of the separation distance (ΔY) on the ferrofluid concentration (v/v) at variable sample flow rates is shown. The flow ratio between the sample and sheath flow was 2. There was an optimal ferrofluid concentration for each sample flow rate. Based on the application needs, we could choose a combination of a ferrofluid concentration and sample flow rate to maximize the separation distance (ΔY). The black dots represent the experimental separation results of 6 μm and 10 μm (diameters) diamagnetic particles with a sample flow rate of 1000 μL min-1 in 0.01%, 0.05%, 0.1%, and 0.15% (v/v) ferrofluids (experimental images in FIG. 3D, bottom panel).

In FIG. 3C, dependence of the separation distance (ΔY) on the sample flow rate at variable ferrofluid concentrations is shown. The flow ratio between the sample and sheath flow was 2. There were optimal sample flow rates for each ferrofluid concentration. The green dots represent the experimental separation results of 6 μm and 10 μm (diameters) diamagnetic particles in 0.1% ferrofluid with sample flow rates of 600, 800, 1000, and 1200 μL $min^{-1}$ (FIG. 3D, top panel).

Figure 3D:
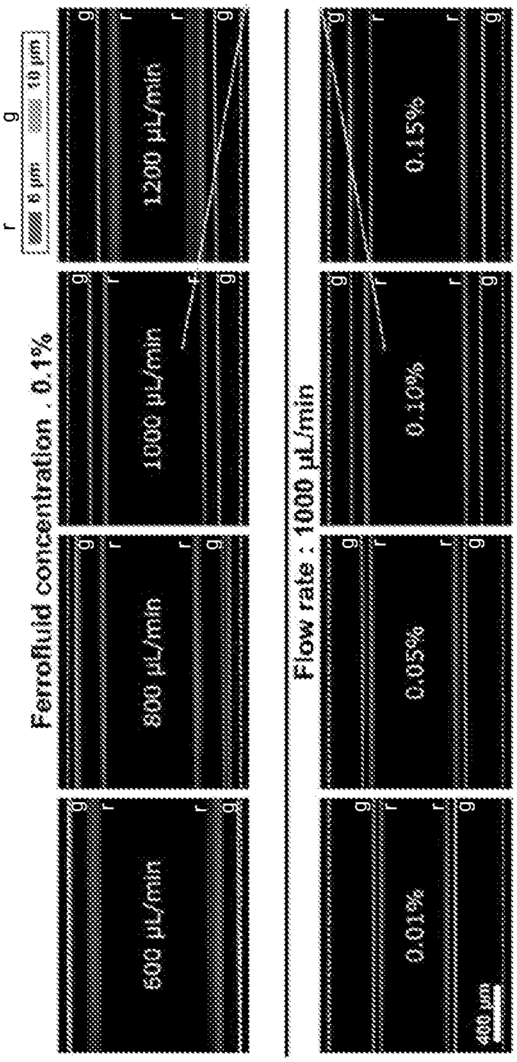
FIG. 3D illustrates fluorescence images of particle separation to verify simulation results with different flow rates according to various embodiments described herein.

In FIG. 3D, fluorescence images of particle separation to verify simulation results with different flow rates (top panel, ferrofluid concentration=0.1%) and different ferrofluid concentrations (bottom panel, flow rate of the sample=1000 μL $min^{-1}$). These images were taken at the end of the inertial-FCS device. In FIG. 3E, s fluorescence image showing clear separation of 6 μm (red fluorescence) and 10 μm (green fluorescence) particles at the outlets of the inertial-FCS device is shown. The dashed lines in the fluorescence images indicate the boundaries of the microchannel. Red fluorescence is indicated with an "r" and green with a "g".

Figure 4B:
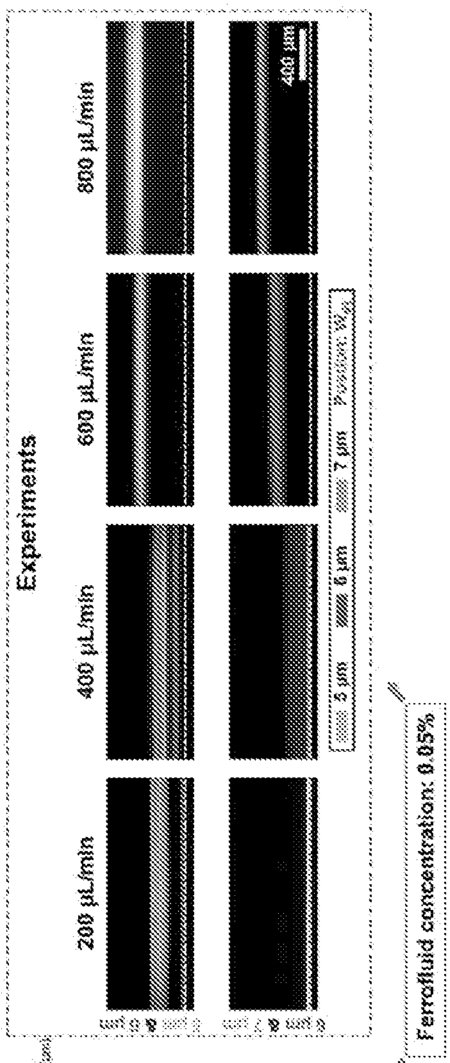
FIG. 4B illustrates experimental results of separation of diamagnetic particles of selected diameters at different flow rates of ferrofluid according to various embodiments described herein.
Figure 4A:
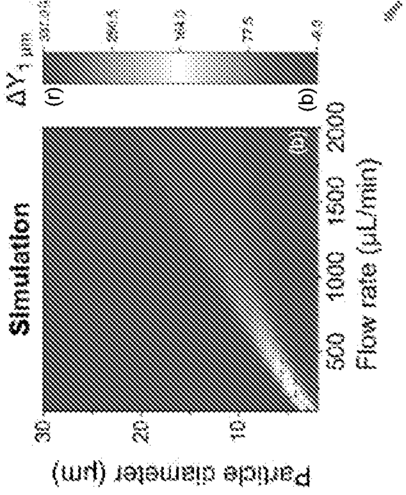
FIG. 4A illustrates example simulation results of the separation distance between particles that had 1 μm difference in their physical diameters. according to various embodiments described herein.
Figures 4C, 4D, 4E, 4F, 4G:
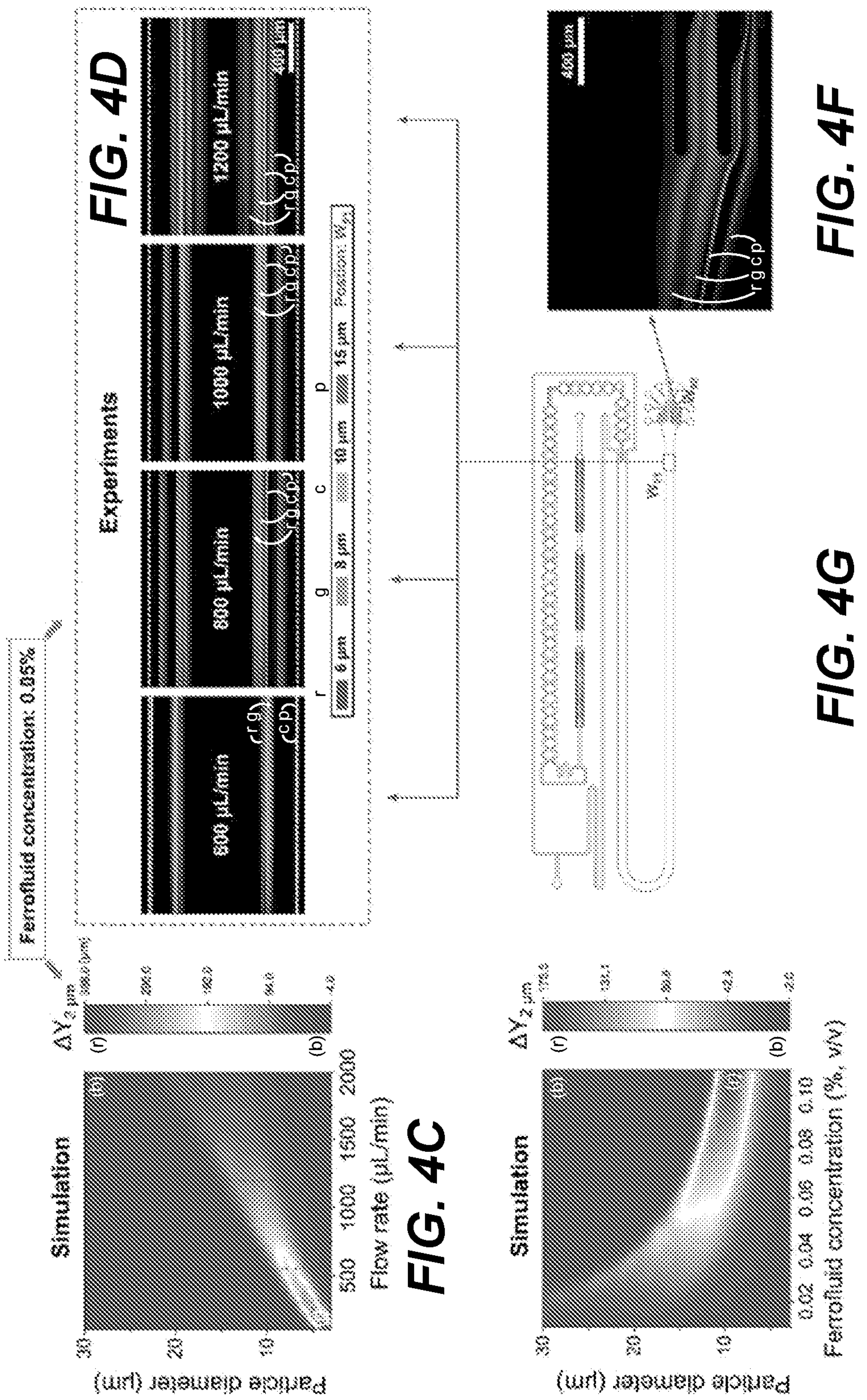
FIG. 4C illustrates example simulation results of the separation distance between particles that had 2 μm difference in their physical diameters according to various embodiments described herein.
FIG. 4D illustrates experimental results of separation of diamagnetic particles of selected diameters at different flow rates of ferrofluid according to various embodiments described herein.
FIG. 4E illustrates example simulation results of the separation distance between particles that had 2 μm difference in their physical diameters at a constant flow rate according to various embodiments described herein.
FIG. 4F illustrates an example of diamagnetic particle separation at the outlets of the device at a 1000 $\mu L\ min^{-1}$ flow rate in a 0.1% (v/v) ferrofluid according to various embodiments described herein.
FIG. 4G illustrates an example top-view schematic drawing indicating locations of observation windows $W_{\#1}$ and $W_{\#2}$ according to various embodiments described herein.

In FIGS. 4A-4G, optimizations of the inertial-FCS device for high separation resolution with parameters including the ferrofluid concentration and sample flow rate are shown. In FIG. 4A, simulation results of the separation distance (ΔY1 μm) between particles that had 1 μm difference in their physical diameters are shown. The separation distance (ΔY1 μm) depended on the flow rate (10-2000 μL $min^{-1}$) and particle diameter (1-30 μm) at a constant ferrofluid concentration (0.05% (v/v)). In FIGS. 4A, 4C and 4E, red areas are indicated with "(r)" and blue areas with "b)". FIG. 4B shows experimental results of separation of 5, 6, and 7 μm (diameters) diamagnetic particles at different flow rates (200, 400, 600, and 800 μL $min^{-1}$) in a 0.05% (v/v) ferrofluid. Dashed lines in fluorescence images indicate the boundaries of the channel. $W_{\#1}$ (FIG. 4G) indicates the location of the observation window in the device for these fluorescence images.

In FIG. 4C, shown are simulation results of the separation distance (ΔY2 μm) between particles that had 2 μm difference in their physical diameters. The separation distance (ΔY2 μm) depended on the flow rate (10-2000 μL $min^{-1}$) and particle diameter (1-30 μm) at a constant ferrofluid concentration (0.05% (v/v)). FIG. 4D shows experimental results of separation of 6, 8, 10 and 15 μm (diameters) diamagnetic particles at different flow rates (600, 800, 1000, and 1200 μL $min^{-1}$) in a 0.05% (v/v) ferrofluid. The dashed lines in the fluorescence images indicate the boundaries of the channel. $W_{\#2}$ (FIG. 4G) indicates the location of the observation window in the device for these fluorescence images. FIG. 4E shows simulation results of the separation distance (ΔY2 μm) between particles that had 2 μm difference in their physical diameters. The separation distance (ΔY2 μm) depended on the ferrofluid concentration (0.01-0.11% (v/v)) and cell diameter (1-30 μm) at a constant flow rate (1500 μL $min^{-1}$). FIG. 4F shows diamagnetic particle (in FIGS. 4D and 4F, 6 μm (red, r), 8 μm (green, g), 10 μm (cyan, c), and 15 μm (purple, p)) separation at the outlets of the device at a 1000 μL $min^{-1}$ flow rate in a 0.1% (v/v) ferrofluid. FIG. 4G shows an example top-view schematic drawing indicating locations of observation windows $W_{\#1}$ and $W_{\#2}$.

FIGS. 5A-5G show inertial-FCS device validation using cancer cells. In FIG. 5A, bright field images of the separation of H1299 cancer cells based on their physical diameters at the outlets of the inertial-FCS device are shown. In the top left image, the outlets of the inertial-FCS device are shown and numbered (#1-5). In this example, ~4×105 cancer cells were spiked into 1 mL of 0.05% (v/v) ferrofluid. Cells were collected from the outlets (#1-5) after separation, as shown. The cancer cell sample flow rate was 1200 μL $min^{-1}$ (72 mL $h^{-1}$). FIG. 5B, shows the distribution of effective diameters of H1299 cancer cells measured before (inlet) and after (outlets #1-5) the separation for the example shown in FIG. 5A. The effective diameters of cancer cells collected from the inlet and outlets #1-5 were 14.08±6.47 μm (n=1287), 20.54±3.34 μm (n=246), 13.49±1.23 μm (n=246), 10.13±0.99 μm (n=380), 8.22±1.26 μm (n=134), and 3.40±0.92 μm (n=118), respectively.

In FIG. 5C, separation of spiked H1299 cancer cells from human white blood cells (left: bright field, phase contrast; right: epifluorescence) is shown. In this example, ~1000 H1299 cancer cells and 6 million WBCs were spiked into 1 mL of 0.05% (v/v) ferrofluid and processed with a flow rate of 1000 μL $min^{-1}$ (60 mL $h^{-1}$), and the cell processing throughput was ~100 000 cells per s. Cancer cells stained with CellTracker green were collected from the bottom outlet (#1), while the majority of WBCs were removed from outlets #2-5.

In FIG. 5D, a recovery rate and purity of separated cancer cells (~100 cancer cells spiked per 1 mL) for different cancer cells lines at a flow rate of 1000 μL $min^{-1}$ (60 mL $h^{-1}$) are shown. Recovery rates of 91.8±4.3%, 95.4±5.1%, 97.2±4.0%, and 94.6±3.1% were achieved for the MDA-MB-231 (breast cancer), MCF7 (breast cancer), H1299 (lung cancer), and H3122 (lung cancer) cell lines, respectively. The corresponding purities of cancer cells of each cell line were 12.9±2.2% (MDA-MB-231), 10.5±1.7% (MCF7), 9.2±1.1% (H1299), and 11.5±1.9% (H3122), respectively. Error bars indicate standard deviation (s.d.) of experiments (n=3). In FIG. 5E, a short-term H1299 cancer cell viability comparison before and after the inertial-FCS device processing is shown. The cell viability of the H1299 cancer cell line before and after separation was 98.3±0.7% and 96.2±0.5%, respectively.

FIG. 5F shows fluorescence images of a live/dead assay immediately after H1299 cancer cell separation. Cells were stained with Calcein AM (green, live cells) and EhD-1 (red, dead cells). FIG. 5G shows representative images of cultured H1299 lung cancer cells after inertial-FCS device processing at 48 hours. The ferrofluid concentration in experiments from (a) to (g) was 0.05% (v/v). FIG. 5G shows immunofluorescence images of 3 individual CTCs enriched from one stage IV non-small cell lung cancer patient. In FIG. 5H, five channels were used in immunofluorescence staining, including the epithelial marker EpCAM (green), leukocyte marker CD45 (red), mesenchymal markers N-cadherin (N-cad, cyan) and vimentin (Vim, magenta), and nucleus marker DAPI (blue) (color not shown). CTCs were identified as cells with either epithelial or mesenchymal expression or both while without the leukocyte marker. FIG. 5I shows bright field images of cultured cells at day 10 and day 30.

FIGS. 6A-6E illustrate an example of inertial-FCS device validation using human white blood cells. In FIG. 6A, bright field images of the separation of white blood cells based on their physical diameters at the outlets of the inertial-FCS device are shown. Cells were collected from different outlets #1-5 and analyzed for their diameter distribution. The cells were suspended in a 0.05% (v/v) concentration ferrofluid and the cell sample flow rate was 1000 μL $min^{-1}$. In FIG. 6B, a distribution of effective diameters of cells collected from the inlet (before separation) and outlets #1-5 (after separation) is shown. The diameters of cells collected from the inlet and the #1-5 outlets were 7.80±3.14 μm (n=2585), 13.85±2.67 μm (n=77), 9.43±1.62 μm (n=428), 6.39±2.12 μm (n=442), 3.15±1.27 μm (n=86), and 3.16±0.77 μm (n=300), respectively.

In FIG. 6C, an example of flow cytometry results of cells collected from outlet #3 showed that 91.6% of the cells in the outlet #3 collection were lymphocytes, 0.56% were monocytes, and 5.26% were granulocytes (top panel). Lymphocytes collected from outlet #3 included both T lymphocytes and B lymphocytes (bottom panel), which were identified using a combination of CD3 and CD19 antibodies. T lymphocytes were identified as CD3+ and B lymphocytes were identified as CD19+. The lymphocyte population consisted of 78.8% T lymphocytes and 17.9% B lymphocytes.

FIG. 6D illustrates an example of immunofluorescence images of cells collected from outlets #1 and #3. Four channels were used in the immunofluorescence staining, including the leukocyte marker CD45 (red), T lymphocyte marker CD3 (green), B lymphocyte marker CD19 (cyan), and nucleus marker DAPI (blue) (colors not shown). White blood cells were identified as CD45+/DAPI+, while T lymphocytes were determined as CD45+/CD3+/DAPI+ and B lymphocytes were determined as CD45+/CD19+/DAPI+. In FIG. 6E, Wright's staining of cells from outlets #1 and #3 is shown. Granulocytes collected from outlet #1 are represented by dotted circles in the left-hand panels, while lymphocytes collected from outlet #3 are represented by dotted circles in the right-hand panels.

Materials and Methods

Ferrofluids Synthesis and Characterization

Maghemite nanoparticles (diameter: 10.91±4.86 nm) were synthesized by a chemical co-precipitation method as previously descried (see reference 33, Zaho, et al., *Lab Chip,* 2017, 17, 2243-2255, incorporated by reference herein), hereby incorporated by reference herein for preparation of maghemite nanoparticles). Size and morphologies of nanoparticles were characterized using transmission electron microscopy (TEM; FEI, Eindhoven, the Netherlands). The viscosity of ferrofluid was measured with a compact rheometer (Anton Paar, Ashland, VA) at room temperature. Volume fraction of magnetic materials and saturation magnetization of the ferrofluid were characterized with a vibrating sample magnetometer (VSM: MicroSense, Lowell, MA). In order to achieve biocompatibility, pH of the ferrofluid was adjusted to 7 and the osmotic pressure was balanced with Hank's Balanced Salt Solution (Thermo Fisher Scientific, Waltham, MA). The concentration of undiluted ferrofluid was measured to be 0.3% (v/v) and corresponding viscosity of the ferrofluid was 1.68 mPa-s at 23° C.

Cell Culture and Sample Preparation

Cancer cell lines (ATCC, Manassas, VA) including two human breast cancer cell lines (MCF7 and MDA-MB-231), and two human lung cancer cell lines (H1299 and H3122) were used in this study. MCF7 and MDA-MB-231 were cultured in DMEM medium (Thermo Fisher Scientific, Waltham, MA), and H1299 and H3122 cell were cultured in RPMI medium. DMEM and RPMI medium were supplemented with 10% (v/v) fetal bovine serum (Thermo Fisher Scientific, Waltham, MA), 1% (v/v) penicillin/streptomycin solution (Thermo Fisher Scientific, Waltham, MA), and 0.1 mM non-essential amino acids solution (Thermo Fisher Scientific, Waltham, MA). Cells were released through incubation with 0.05% trypsin-EDTA solution (Thermo Fisher Scientific, Waltham, MA) at 37° C. for 5 minutes. The concentration of harvested cells was measured with automated cell counter (Countess™, Thermo Fisher Scientific, Waltham, MA). After dilution with PBS, the exact number of cells were counted with a Nageotte counting chamber (Hausser Scientific, Horsham, PA). Desired cancer cells were spiked into 1 mL ferrofluid.

Inertial-FCS Device Fabrication and Assembly

The mold of inertial-FCS device was fabricated by SU-8 2025 photoresist (Kayaku Advance Materials, Westborough, MA) with a channel height of 60 μm, which was measured by a profilometer (Veeco Instruments, Chadds Ford, PA). Polydimethylsiloxane (PDMS) devices were prepared with a Sylgard 184 silicone elastomer kit (Ellsworth Adhesives, Germantown, WI) using a 1:7 ratio of cross linker and base, followed by a curing at 70° C. for 3 hours. The fabricated microchannel was placed in the sextupole permanent magnet array (N52, K&J Magnetics, Pipersville, PA) and held in a custom-made aluminum manifold. Each magnet was 50.8 mm in length, 6.35 mm in both width and thickness, with a residual magnetic flux density of 1.48 T.

Microfluidic Experiment Setup and Procedure

The inertial-FCS microchannel was first treated with plasma for 3 minutes, followed by an ethanol (70%) flushing for 10 minutes. The microchannel was then primed with PBS supplemented with 0.5% (w/v) bovine serum albumin (BSA) and 2 mM EDTA (Thermo Fisher Scientific, Waltham, MA). Sample fluids and sheath fluids were individually controlled with syringe pumps (Chemyx, Stafford, TX) at variable flow rates. Images and videos of cells were obtained with an inverted microscope equipped with a CCD camera (Carl Zeiss, Germany).

CTC Processing

Cancer patient samples collected at the University Cancer and Blood Center (Athens, Georgia) were approved by the University of Georgia Institutional Review Board (IRB) (VERSION00000869) before study initiation and informed consent was obtained from the participants. Blood was first lysed with RBC lysis buffer (eBioscience, San Diego, CA) for 10 minutes at room temperature, centrifuged at 500×g for 5 minutes, and resuspended in 0.05% ferrofluid. After processing with the inertial-FCS device, collected cells were centrifuged at 500×g for 5 minutes at room temperature and resuspend in DMEM/F12 medium supplemented with B27 supplement (1×; Thermo Fisher Scientific, Waltham, MA), epidermal growth factor (20 ng/mL; Millipore Sigma, Burlington, MA), basic fibroblast growth factor (10 ng/mL; Thermo Fisher Scientific, Waltham, MA), L-Glutamine (2 mM; Thermo Fisher Scientific, Waltham, MA), and Penicillin-Streptomycin (1×; Thermo Fisher Scientific, Waltham, MA). Cells were cultured in a vented T25 flask at 37° C. with 5% $CO_2$. Cultures were supplemented with fresh medium every 3 days and washed every 5 days with 1×PBS.

Human White Blood Cells

Human whole blood cells from donors was purchased from a commercial source (Zen-Bio, Research Triangle, NC) and lysed with RBC lysis buffer (eBioscience, San Diego, CA) for 5 minutes to remove red blood cells at room temperature. Remaining blood cells were then suspended in the same volume of ferrofluid (0.05% v/v) containing 0.1% (v/v) Pluronic F-68 non-ionic surfactant (Thermo Fisher Scientific, Waltham, MA) before device processing.

Flow Cytometry of WBCs

Types of separated WBCs were confirmed using flow cytometry (Agilent Quanteon, Agilent, Santa Clara, CA). WBC size and granularity were used to distinguish the granulocytes, lymphocytes and monocytes. Size information were collected from the forward scatter (FSC) while the granularity of the cells was predicted with the side scatter. Fluorescent signals were used to further identify the WBC types: CD45+/CD3+ was classified as T lymphocytes; CD45+/CD19+ was classified as B lymphocytes.

Immunofluorescence Staining

After inertial-FCS device processing, all the outlet sample were collected and resuspend with PBS. The collected cells were fixed with 4% (w/v) paraformaldehyde solution (Santa Cruz Biotechnology, Inc., Dallas, TX) for 10 minutes and subsequently permeabilized with 0.1% (v/v) Triton X-100 (Alfa Aesar, Haverhill, MA) in PBS for 10 minutes. The cells were blocked with a blocking reagent (Santa Cruz Biotechnology, Dallas, TX) for 30 minutes to reduce nonspecific binding, and immunostained with primary antibodies. In the CTC experiments, the primary antibodies used were anti-EpCAM, anti-CD45, anti-vimentin, anti-N-cadherin (Santa Cruz Biotechnology, Inc, Dallas, TX). Anti-CD45, anti-CD3, and anti-CD19 (Santa Cruz Biotechnology, Inc, Dallas, TX) were used in the lymphocytes experiment. After immunofluorescence staining, the cells were washed and resuspended with PBS. A small portion of cells was cover slipped with mounting medium supplied with DAPI (Electron Microscopy Sciences, Hatfield, PA) for imaging.

Hematologic Staining of WBCs

Separated WBCs was differentiated using Wright's stain (Millipore Sigma, Burlington, MA) following manufacture's protocol. Briefly, isolated cell was placed on poly-L-lysine coated glass slides for 1 hour at 4° C. The slides were flooded with 1 mL Wright Stain. After 30 seconds, 1 mL deionized water was added and mixed thoroughly for 1 minute. The slides were thoroughly rinsed with deionized water and air-dried before inspection and imaging.

Cancer Cell Recovery Rate and Purity Calculation

Collected cells from device outlets were stained with 2 μM DAPI (Thermo Fisher Scientific, Waltham, MA) to identify the nucleated cell. The number of cells was counted with a Nageotte counting chamber. Cells with CellTracker signal was identified as cancer cells, while other cells with DAPI signal was classified as white blood cells. The recovery rate was calculated by the number of collected cancer cells/number of spiked cancer cells. The purity was calculated by the number of collected cancer cells/number of collected nucleated cells.

Cell Diameter Measurement

Cells were deposited onto microscope slides and imaged with a microscope in bright field mode. Images of cells were analyzed by the ImageJ software. The effective diameter of the cells was calculated using their surface areas with the assumption that cells were spherical.

References for Example 1

1. Y. Chen, P. Li, P. H. Huang, Y. Xie, J. D. Mai, L. Wang, N. T. Nguyen and T. J. Huang, *Lab Chip,* 2014, 14, 626-645.
2. C. W. t. Shields, C. D. Reyes and G. P. Lopez, *Lab Chip,* 2015, 15, 1230-1249.
3. D. R. Gossett, W. M. Weaver, et al., *Anal Bioanal Chem,* 2010, 397, 3249-3267.
4. M. Poudineh, E. H. Sargent, et al., *Nat Biomed Eng,* 2018, 2, 72-84.
5. C. Alix-Panabieres and K. Pantel, *Nat Biomed Eng,* 2017, 1.
6. J. Massague and A. C. Obenauf, *Nature,* 2016, 529, 298-306.
7. M. G. Krebs, R. L. Metcalf, et al., *Nat Rev Clin Oncol,* 2014, 11, 129-144.
8. E. Heitzer, I. S. Haque, et al., *Nat Rev Genet,* 2019, 20, 71-88.
9. N. Ma and S. S. Jeffrey, *Science,* 2020, 367, 1424-1425.
10. C. H. June, R. S. O'Connor, et al., *Science,* 2018, 359, 1361-1365.
11. S. A. Rosenberg and N. P. Restifo, *Science,* 2015, 348, 62-68.
12. S. A. Rosenberg, *Nat Rev Clin Oncol,* 2014, 11, 630-632.
13. B. P. Dodson and A. D. Levine, *BMC Biotechnol,* 2015, 15, 70.
14. S. Miltenyi, W. Muller, W. Weichel and A. Radbruch, *Cytometry,* 1990, 11, 231-238.
15. W. A. Bonner, H. R. Hulett, R. G. Sweet and L. A. Herzenberg, *Rev Sci Instrum,* 1972, 43, 404-409.
16. K. K. Zeming, N. V. Thakor, Y. Zhang and C.-H. Chen, *Lab on a Chip,* 2016, 16, 75-85.
17. P. Li, Z. M. Mao, Z. L. Peng, L. L. Zhou, Y. C. Chen, P. H. Huang, C. I. Truica, J. J. Drabick, W. S. El-Deiry, M. Dao, S. Suresh and T. J. Huang, *P Natl Acad Sci USA,* 2015, 112, 4970-4975.
18. Y.-C. Kung, K. R. Niazi and P.-Y. Chiou, *Lab on a Chip,* 2020.
19. J. Takagi, M. Yamada, M. Yasuda and M. Seki, *Lab on a Chip,* 2005, 5, 778-784.
20. J. Darabi and C. Guo, *Biomicrofluidics,* 2013, 7, 054106.
21. M. Mizuno, M. Yamada, et al., *Anal Chem,* 2013, 85, 7666-7673.
22. M. E. Warkiani, B. L. Khoo, et al., *Nature protocols,* 2016, 11, 134-148.
23. P. L. Chiu, C. H. Chang, Y. L. Lin, et al., *Sci Rep-Uk,* 2019, 9.
24. N. Nivedita and I. Papautsky, *Biomicrofluidics,* 2013, 7.
25. E. Sollier, D. E. Go, et al., *Lab on a Chip,* 2014, 14, 63-77.
26. Z. Wu, Y. Chen, M. Wang and A. J. Chung, *Lab on a Chip,* 2016, 16, 532-542.
27. J. Cruz, T. Graells, M. Walldén and K. Hjort, *Lab on a Chip,* 2019, 19, 1257-1266.
28. D. Di Carlo, D. Irimia, et al., *Proc Natl Acad Sci USA,* 2007, 104, 18892-18897.
29. H. Amini, W. Lee and D. Di Carlo, *Lab Chip,* 2014, 14, 2739-2761.
30. D. Di Carlo, *Lab Chip,* 2009, 9, 3038-3046.
31. R. E. Rosensweig, *Ferrohydrodynamics*, Cambridge University Press, Cambridge, 1985.
32. W. Zhao, R. Cheng, B. D. Jenkins, T. Zhu, N. E. Okonkwo, C. E. Jones, M. B. Davis, S. K. Kavuri, Z. Hao, C. Schroeder and L. Mao, *Lab Chip,* 2017, 17, 3097-3111.
33. W. Zhao, R. Cheng, S. H. Lim, J. R. Miller, W. Zhang, W. Tang, J. Xie and L. Mao, *Lab Chip,* 2017, 17, 2243-2255.
34. W. Zhao, T. Zhu, R. Cheng, Y. Liu, J. He, H. Qiu, L. Wang, T. Nagy, T. D. Querec, E. R. Unger and L. Mao, *Adv Funct Mater,* 2016, 26, 3990-3998.
35. W. Zhao, R. Cheng, J. R. Miller and L. Mao, *Adv Funct Mater,* 2016, 26, 3916-3932.
36. X. Xuan, *Micromachines,* 2019, 10, 744.
37. R. Cheng, T. Zhu and L. Mao, *Microfluidics and Nanofluidics,* 2014, 16, 1143-1154.
38. T. Zhu, D. J. Lichlyter, M. A. Haidekker and L. Mao, *Microfluidics and Nanofluidics,* 2011, 10, 1233-1245.
39. W. Zhao, Y. Liu, B. D. Jenkins, R. Cheng, B. N. Harris, W. Zhang, J. Xie, J. R. Murrow, J. Hodgson, M. Egan, A. Bankey, P. G. Nikolinakos, H. Y. Ali, K. Meichner, L. A. Newman, M. B. Davis and L. Mao, *Lab Chip,* 2019, 19, 1860-1876.
40. W. P. Daniels V G, Burkitt H G, *Functional histology: A text and colour atlas*, Churchill Livingstone, 1979.

Example 2

This Example provides data and information supplemental to Example 1, above.

TABLE S1

Comparison of throughputs and separation resolutions

| Type | Methods | Flow rate μl/min | Through-put cells/s | Purity | Separation resolution | Biological particles separated |
|---|---|---|---|---|---|---|
| Inertial microfluidics | Spiral system (Dean drag force)[1] | 100 | 6.17E+03 | NA | 5 μm (10 and 15 μm) | CTCs |
| | Spiral channel[2] | 1700 | 2.17E+03 | 97% | NA | lymphocytes |
| | Spiral devices[3] | 1000-2000 | 1.67E+04 | NA | 2.7 μm (7.32 and 10 μm) | WBCs & RBCs |
| | Vortex[4] | 350 | 1.67E+05 | 57-94% | 4 μm (15 and 19 μm) | CTCs |

TABLE S1-continued

| Comparison of throughputs and separation resolutions | | | | | | |
|---|---|---|---|---|---|---|
| Type | Methods | Flow rate μl/min | Through-put cells/s | Purity | Separation resolution | Biological particles separated |
| | Straight channel with micro-structures.[5] | 100-150 | 2.50E+04 | 92-98% | 4.4 μm (5.5 and 9.9 μm) | blood cells (WBCs, RBCs) |
| | Curved channel[6] | 30-120 | 5-16E+04 | NA | 1.5 μm (0.5 and 2 μm) | bacteria |
| Deterministic lateral displacement | DLD device[7] | 0.05 | NA | NA | 140 nm (51 and 190 nm) | NA |
| Accousto-fluidics | taSSAW[8] | 20 | 3.33E+02 | NA | 2.6 μm (7.3 and 9.9 μm) | CTCs |
| DEP | TDEP[9] | 3.3 | NA | NA | 1 μm (9 and 10 μm) | monocyte separation |
| Pinched flow fractionation | AsPFF[10] | 0.3 | 10 | NA | 1 μm (1, 2, 3, and 5 μm) | erythro-cytes |
| Filtration | Hydrodynamic filtration[11] | 10 | 100 | 90% | NA | T cells |
| | Step Pattern filtration[12] | 0.1 | 128 | 90 | NA | JM cells |
| Inertial-Ferrohydro-dynamics | Inertial-FCS* | 1000-1200 | 1.00E+05 | 11% (spiked cancer cells) 11.70% and 36.39% (two patient samples) 91.60% (lymphocytes) | 1 μm (for particles < 10 μm in diameter) 2 μm (for particles 10-30) | cancer cell line, lymphocyte |

The superscript in "Methods" indicates the relevant reference.
*indicates the present disclosure Reynolds Number Calculation in the Inertial-FCS Device Channel Reynold's Number ($R_c$):

$$R_c = \frac{\rho v L}{\mu} \quad (1)$$

$$L = \frac{2 \times W \times H}{(W + H)} \quad (2)$$

Where ρ is density of the fluid, v is the maximum channel velocity, L is characteristic channel dimension, μ is dynamic viscosity of the fluid, W is the channel width, and H is the channel height.

Particle Reynold's Number ($R_p$):

$$R_p = R_c \times (D/L)^2 \quad (2)$$

Where D is the particle diameter.

TABLE S2

| Reynold's number in inertial focusing and separation stages | | |
|---|---|---|
| Stage | $R_c$ | $R_p$ |
| Inertial focusing stage | 63.8 | 1.3 |
| Ferrohydrodynamic separation stage | 31.9 | 0.4 |

The sample flow rate was 1000 μL $min^{-1}$ and the sheath flow rate was 500 μL $min^{-1}$.

TABLE S3

| Difference between mean cell diameters from the cancer cell and WBCs validation experiments. | | | | | |
|---|---|---|---|---|---|
| Cell | Flow rate | Diameter difference between cells from different outlets (μm) | | | |
| Type | (mL/h) | #1-#2 | #2-#3 | #3-#4 | #4-#5 |
| H1299 lung cancer cells | 72 | 7.05 ± 3.56 | 3.36 ± 1.58 | 1.91 ± 1.60 | 4.82 ± 1.56 |
| H1299 lung cancer cells | 60 | 9.23 ± 5.07 | 2.29 ± 2.09 | 3.19 ± 1.92 | 1.57 ± 2.06 |
| WBCs | 60 | 4.42 ± 3.13 | 3.04 ± 2.66 | 3.23 ± 2.47 | 0.00 ± 1.48 |

TABLE S4

Morphological comparison of human lung cancer cell line (H1299) before and after the inertial-FCS processing

| | Diameter (μm) | Circularity | Aspect ratio | Roundness | Solidity | Number of cells |
|---|---|---|---|---|---|---|
| Before | 22.81 ± 4.72 | 0.88 ± 0.06 | 1.15 ± 0.20 | 0.90 ± 0.10 | 0.96 ± 0.03 | 500 |
| After | 23.54 ± 5.11 | 0.87 ± 0.07 | 1.07 ± 0.06 | 0.93 ± 0.04 | 0.95 ± 0.01 | 500 |

TABLE S5

CTC isolation purity of patient samples using inertial-FCS

| | Cancer type/ stage | No. of CTCs per 1 mL of blood | No. of WBCs per 1 mL of blood | Purity (%) |
|---|---|---|---|---|
| Patient 1 | Lung, IV | 145 | N/A | N/A |
| Patient 2 | Lung, IV | 215 | N/A | N/A |
| Patient 3 | Lung, IIIB | 72 | 547 | 11.70 |
| Patient 4 | Lung, IIIB | 173 | 302 | 36.39 |

Purity is defined as the ratio of the number of CTCs and the number of total cells found at the collection outlet of the inertial-FCS device.

Figure 10A:
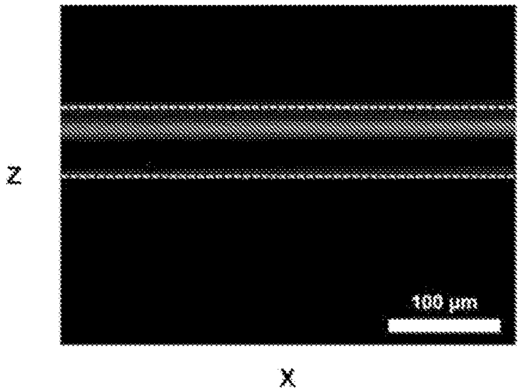
FIG. 10A illustrates an example side view of inertial focusing of 15 μm polystyrene beads at the sample flow rates of ferrofluid in the inertial-FCS device according to various embodiments described herein.
Figure 10B:
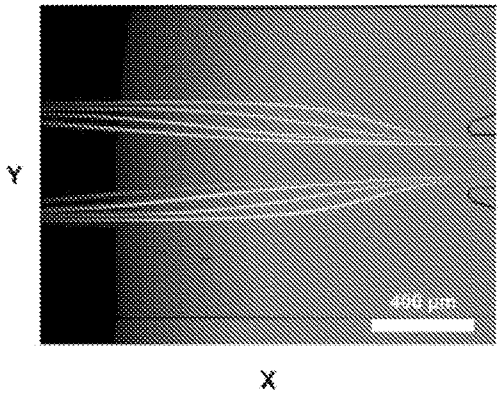
FIG. 10B illustrates an example a top view of inertial focusing of 15 μm polystyrene beads at different sample flow rates ferrofluid in the inertial-FCS device according to various embodiments described herein.

In FIG. 10A, a side view of inertial focusing of 15 μm polystyrene beads at the sample flow rates of 1000 μL/min in a 0.05% (v/v) ferrofluid in the inertial-FCS device is shown. The ratio of particle flow and sheath flow was 2:1. In FIG. 10B, a top view of inertial focusing of 15 μm polystyrene beads at different sample flow rates (400-1000 μL/min) in a 0.05% (v/v) ferrofluid in the inertial-FCS device is shown. The flow ratio between sample and sheath flow was 2:1.

Figure 11A:
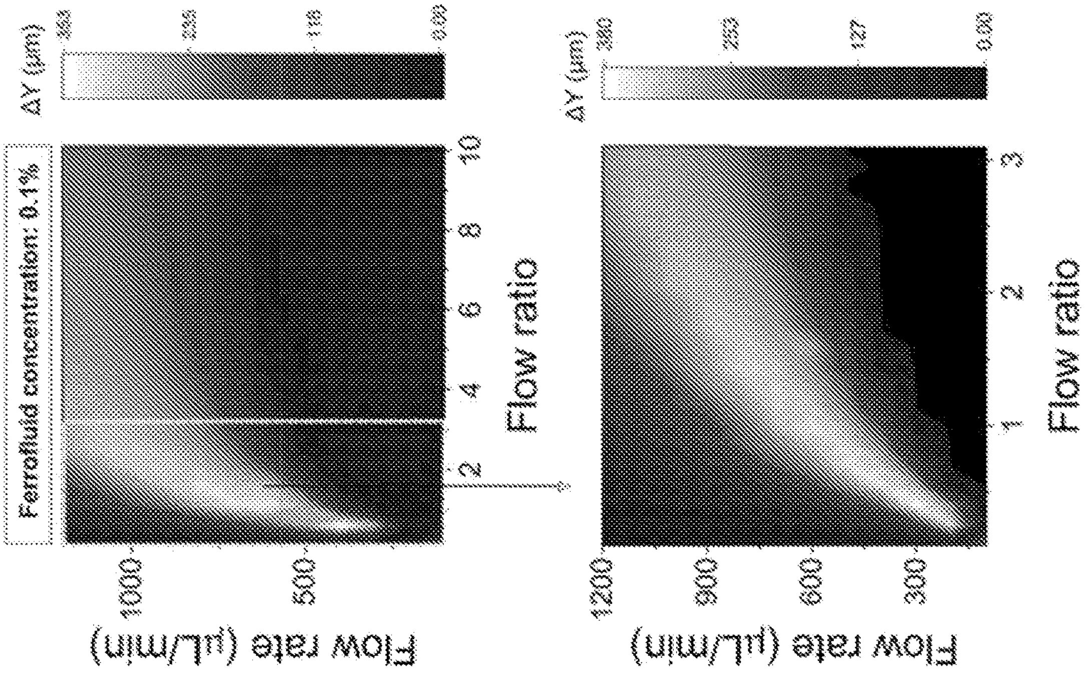
FIGS. 11A and 11B illustrate an example of dependence of diamagnetic particles separation distance (ΔY) on the sample flow rate and the ratio between the sample and sheath flow according to various embodiments described herein
Figure 11B:
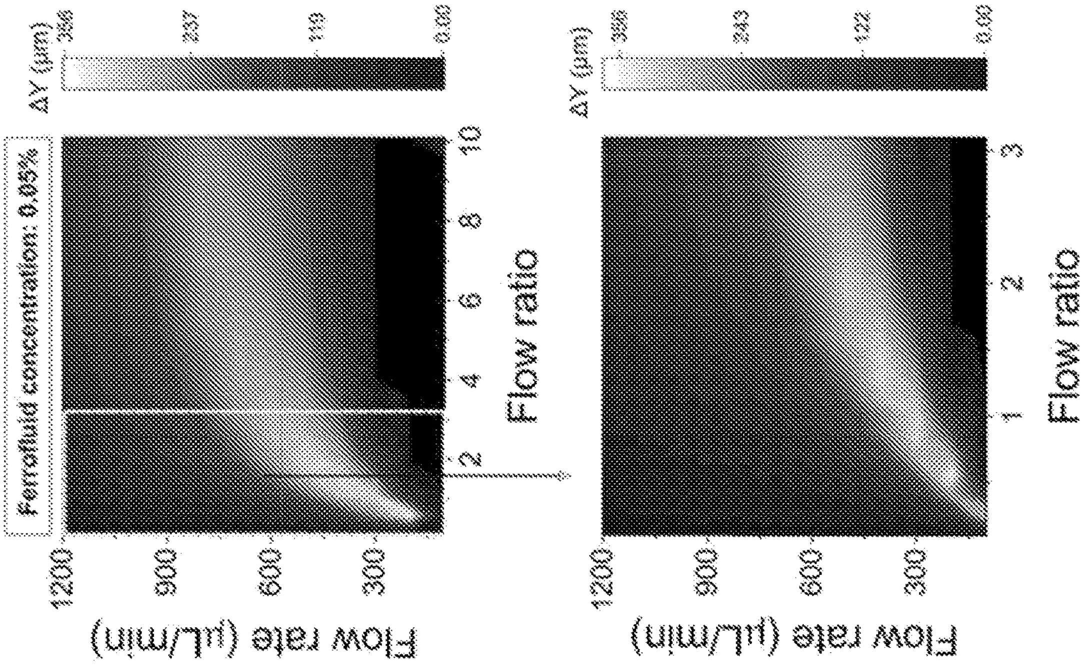

FIGS. 11A and 11B illustrate an example of dependence of diamagnetic particles separation distance (ΔY) on the sample flow rate and the ratio between the sample and sheath flow. In FIG. 11A, simulation of separation distance between 6 and 10 μm (diameters) diamagnetic particles in 0.1% (v/v) ferrofluid is shown. In FIG. 11B, simulation of separation distance between 6 and 10 μm (diameter) diamagnetic particles in 0.05% (v/v) ferrofluid is shown.

Figure 12A:
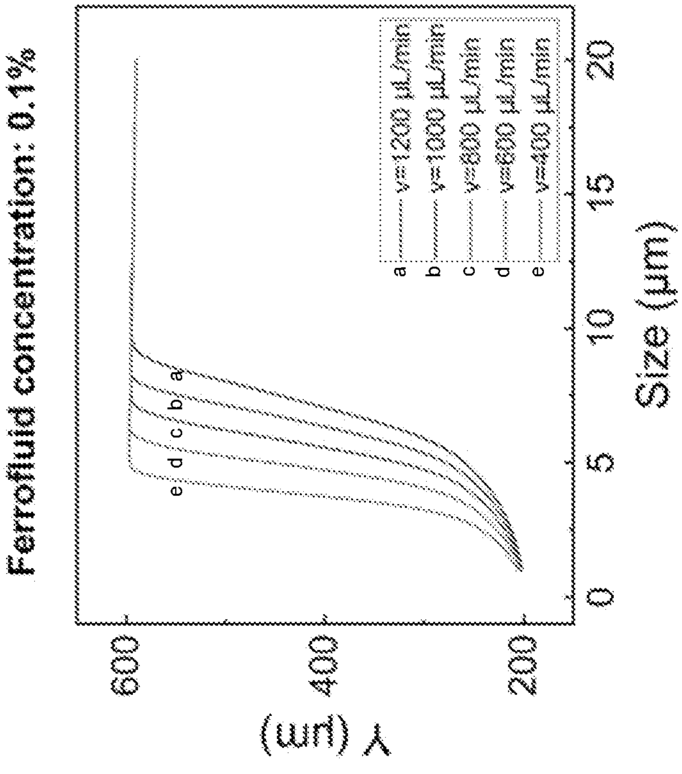
FIGS. 12A and 12B illustrate example simulation results of final position of diamagnetic particles of variable diameters, at different sample flow rates according to various embodiments described herein.
Figure 12B:
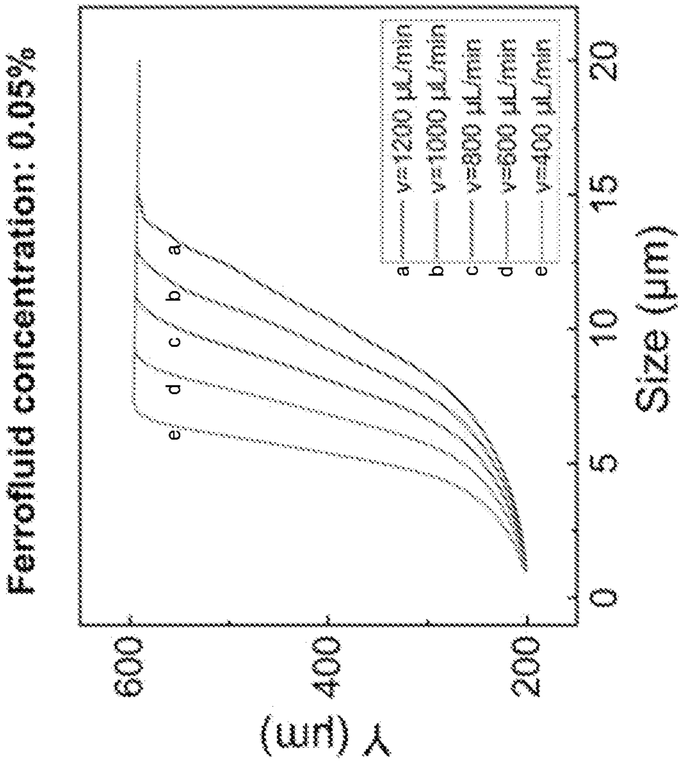

FIGS. 12A and 12B illustrate example simulation results of final position of diamagnetic particles of variable diameters, at different sample flow rates (400-1200 μL $min^{-1}$). Shown in FIG. 12A are results in a 0.1% (v/v) ferrofluid. Shown in FIG. 12A are results in a 0.05% (v/v) ferrofluid. Simulation results confirmed that the ferrohydrodynamic deflections depended on the particle diameter.

Figure 13A:
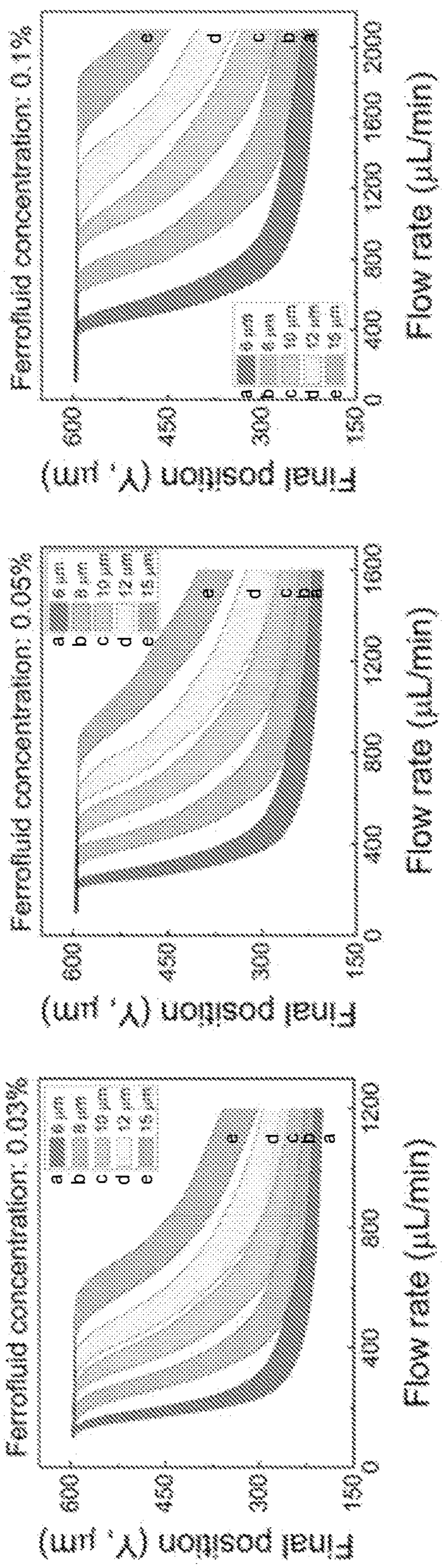
FIG. 13A illustrates an example simulated separation of diamagnetic particles according to various embodiments described herein.
Figure 13B:
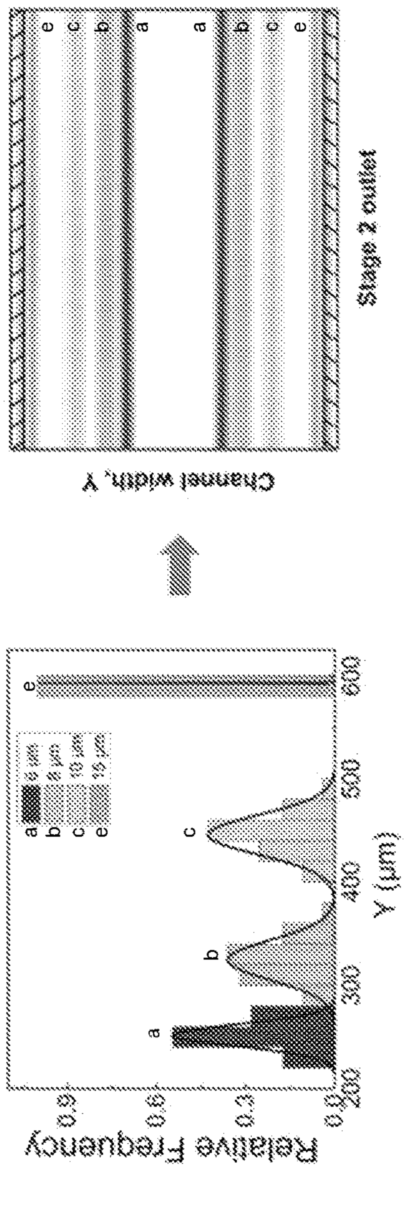
FIG. 13B illustrates simulated particles distributions at the outlet of the inertial-FCS device according to various embodiments described herein.

In FIG. 13A, shown are simulated separation of diamagnetic particles (6 μm, 8 μm, 10 μm, 12 μm, 15 μm diameter) at 100-1200 μL/min flow rate in the 0.03%, 0.05% and 0.1% (v/v) ferrofluid. FIG. 13B shows simulated particles distributions (6 μm, 8 μm, 10 μm, 15 μm) at the outlet of the inertial-FCS device. The ferrofluid concentration was 0.05% and the flow rate was 800 μL/min.

Figure 14A:
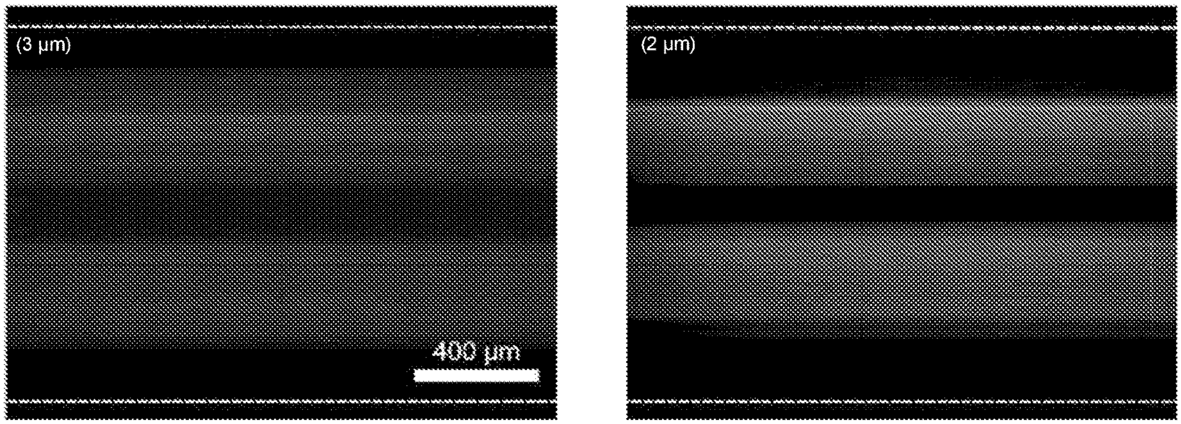
FIGS. 14A and 14B illustrate examples of ineffective inertial focusing of small particles resulted in poor separation according to various embodiments described herein.
Figure 14B:
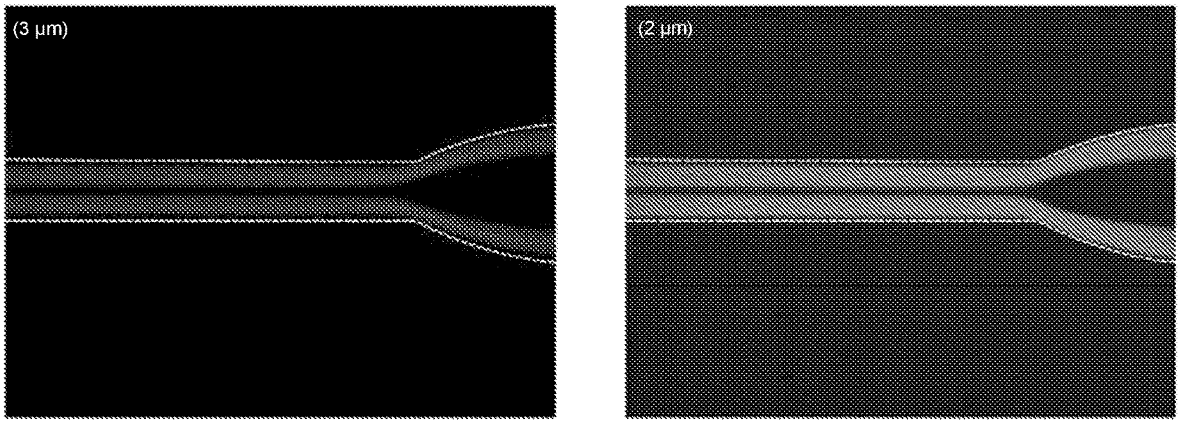

FIGS. 14A and 14B illustrate examples of ineffective inertial focusing of small particles resulted in poor separation. Experimental results of separation of 2 and 3 μm diamagnetic particles in 0.05% ferrofluid at a flow rate of 400 μL/min. In FIG. 14A, fluorescence images of particle distribution (left: 3 μm, right: 2 μm) near collection outlets showed no spatial separation between the two particles is shown. In FIG. 14B, fluorescence images of particle distribution (left: 3 μm, right: 2 μm) at the end of inertial focusing stage showed ineffective focusing is shown.

Figure 15A:
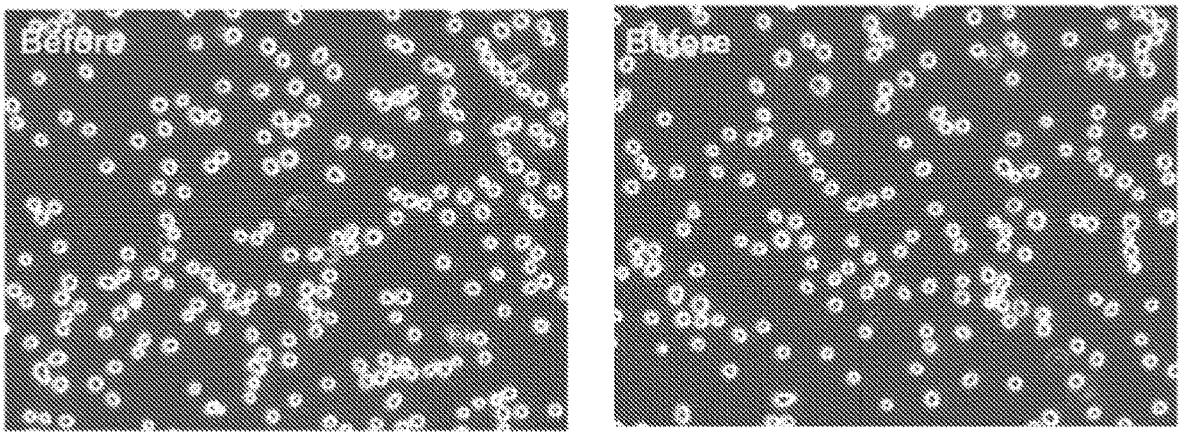
FIGS. 15A and 15B illustrate bright field images of human lung cancer cell line (H1299) before and after the inertial-FCS processing according to various embodiments described herein.
Figure 15B:
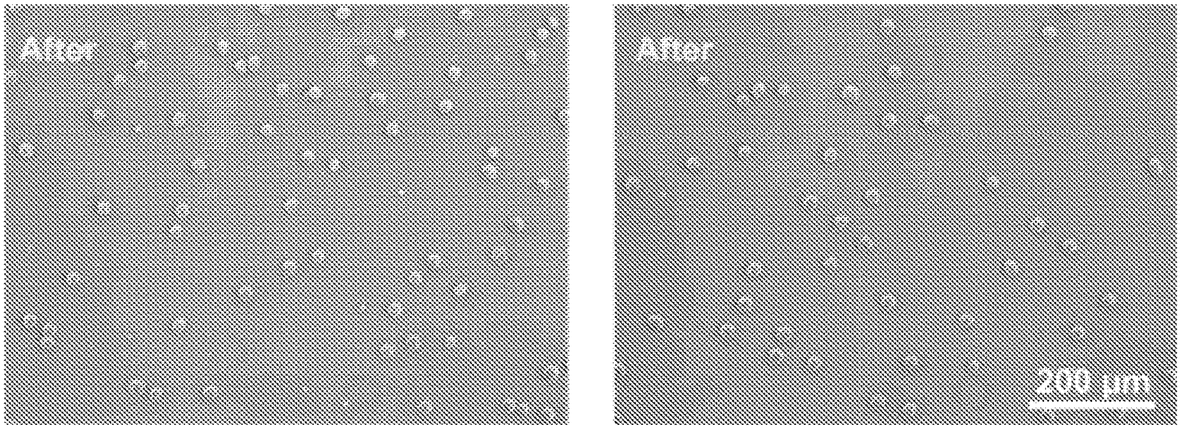

FIGS. 15A and 15B illustrate bright field images of human lung cancer cell line (H1299) before and after the inertial-FCS processing. FIG. 15A shows two examples of cells before the inertial-FCS processing. FIG. 15B shows two examples of the cells in FIG. 15A after the inertial-FCS processing (flow rate: 60 mL $h^{-1}$, ferrofluid concentration: 0.05% (v/v)).

References for Example 2

1. M. E. Warkiani, B. L. Khoo, L. Wu, A. K. P. Tay, A. A. S. Bhagat, J. Han and C. T. Lim, *Nature protocols,* 2016, 11, 134-148.
2. P. L. Chiu, C. H. Chang, Y. L. Lin, P. H. Tsou and B. R. R. Li, *Sci Rep-Uk,* 2019, 9.
3. N. Nivedita and I. Papautsky, *Biomicrofluidics,* 2013, 7.
4. E. Sollier, D. E. Go, J. Che, D. R. Gossett, S. O'Byrne, W. M. Weaver, N. Kummer, M. Rettig, J. Goldman, N. Nickols, S. McCloskey, R. P. Kulkarni and D. Di Carlo, *Lab on a Chip,* 2014, 14, 63-77.
5. Z. Wu, Y. Chen, M. Wang and A. J. Chung, *Lab on a Chip,* 2016, 16, 532-542.
6. J. Cruz, T. Graells, M. Walldén and K. Hjort, *Lab on a Chip,* 2019, 19, 1257-1266.
7. K. K. Zeming, N. V. Thakor, Y. Zhang and C.-H. Chen, *Lab on a Chip,* 2016, 16, 75-85.
8. P. Li, Z. M. Mao, Z. L. Peng, L. L. Zhou, Y. C. Chen, P. H. Huang, C. I. Truica, J. J. Drabick, W. S. El-Deiry, M. Dao, S. Suresh and T. J. Huang, *P Natl Acad Sci USA,* 2015, 112, 4970-4975.
9. Y.-C. Kung, K. R. Niazi and P.-Y. Chiou, *Lab on a Chip,* 2020.
10. J. Takagi, M. Yamada, M. Yasuda and M. Seki, *Lab on a Chip,* 2005, 5, 778-784.
11. J. Darabi and C. Guo, *Biomicrofluidics,* 2013, 7, 054106.
12. M. Mizuno, M. Yamada, R. Mitamura, K. Ike, K. Toyama and M. Seki, *Anal Chem,* 2013, 85, 7666-7673.

We claim at least the following:

1. A multi-stage microfluidic device for separating cells/particles in a sample, the device comprising:

a first microfluidic channel having a first and second end;

a first fluid inlet at the first end of the microfluidic channel and configured to receive a fluid sample comprising the sample combined with a ferrofluid;

an inertial focusing stage at the second end of the first microfluidic channel, wherein the first microfluidic channel splits into two or more serpentine focusing channels at a first end of the inertial focusing stage, each serpentine focusing channel having a plurality of alternating micro-curves configured to focus cells/particles within the sample into a narrow stream to produce a focused fluid sample stream and wherein the two or more serpentine focusing channels form a convergence at a second end of the inertial focusing stage;

at least two sheathing fluid channels fluidly connected to one or more sheathing fluid inlets, the sheathing fluid channels configured such that the convergence of the serpentine focusing channels is between the at least two sheathing fluid channels;

a ferrohydrodynamic separation stage at the second end of the inertial focusing stage, wherein the convergence of the serpentine focusing channels further converges with the at least two sheathing fluid channels at a first end of the ferrohydrodynamic separation stage to form a ferrohydrodynamic separation channel configured such that the focused fluid sample stream exiting the convergence of the focusing channels enters the ferrohydrodynamic separation channel in a central portion of the ferrohydrodynamic separation channel and a sheathing ferrofluid exiting the sheathing fluid channels enters the ferrohydrodynamic separation channel on the periphery of the ferrohydrodynamic separation channel serving to further narrow the focused fluid sample stream and adjust its starting position in the ferrohydrodynamic separation channel;

a magnetic source in the ferrohydrodynamic separation stage configured to produce a substantially symmetric magnetic field having a field maximum along an inner longitudinal axis of the ferrohydrodynamic separation channel sufficient to cause cells/particles flowing in the ferrohydrodynamic separation channel to be deflected away from the center of the ferrohydrodynamic separation channel towards the sides of the ferrohydrodynamic separation channel as a function of the size of the cells/particles; and three or more outlets at a second end of the ferrohydrodynamic separation stage, each outlet positioned to receive cells/particles in fluid flowing along a different portion of the ferrohydrodynamic separation channel from each of the other outlets such that cells/particles in the fluid sample are separated by size.

2. The multi-stage microfluidic device of claim 1, wherein the magnetic source comprises an array of magnets comprising a top array and bottom array, wherein the ferrohydrodynamic separation stage is sandwiched between and substantially centrally aligned between the top magnet array and the bottom magnet array, wherein the magnets in the top array are oriented to repel the magnets in the bottom array.

3. The multi-stage microfluidic device of claim 2, wherein the array of magnets comprises six magnets arranged in a sextupole configuration.

4. The multi-stage microfluidic device of claim 1, wherein the first microfluidic channel comprises one or more filters between the inlet and the second end of the first microfluidic channel, the filters configured to separate debris from the fluid sample before the fluid sample enters the inertial focusing stage.

5. The multi-stage microfluidic device of claim 1, wherein the first microfluidic channel comprises one or more bends at the second end of the first microfluidic channel before the inertial focusing stage.

6. The multi-stage microfluidic device of claim 1, wherein the two or more serpentine focusing channels each comprise about 30-50 alternating micro-curves.

7. The multi-stage microfluidic device of claim 1, wherein the serpentine focusing channels comprise alternating small and large micro-curves.

8. The multi-stage microfluidic device of claim 7, wherein an interior channel width of each serpentine focusing channel varies along the length of said channel, wherein the interior channel width at a crest portion of each small micro-curve is about 50-200 μm and wherein the interior channel width at a crest portion of each large micro-curve is about 100-400 μm.

9. The multi-stage microfluidic device of claim 1, wherein the ferrohydrodynamic separation channel comprises a first section and a second section connected by a substantially u-shaped curve, such that the ferrohydrodynamic separation channel passes through the magnetic field twice to increase separation of the particles.

10. The multi-stage microfluidic device of claim 1, wherein the sample is a lysed blood sample, and the cells/particles comprise white blood cells and target cells.

11. The multi-stage microfluidic device of claim 10, wherein target cells are selected from circulating tumor cells and lymphocytes.

12. The multi-stage microfluidic device of claim 1, wherein the ferrofluid and the sheathing ferrofluid each comprise a plurality of magnetic nanoparticles, a surfactant, and a carrier fluid.

13. The multi-stage microfluidic device of claim 1, wherein the one or more sheathing fluid inlets is a single sheathing fluid inlet.

14. The multi-stage microfluidic device of claim 4, wherein the first microfluidic channel comprises three filters.

15. The multi-stage microfluidic device of claim 1, wherein the two or more serpentine focusing channels comprises a first serpentine focusing channel and a second serpentine focusing channel at the first end of the inertial focusing stage, both the first serpentine focusing channel and the second serpentine focusing channel having a plurality of alternating micro-curves, wherein the plurality of alternating micro-curves of the first serpentine focusing channel mirrors the plurality of alternating micro-curves of the second serpentine focusing channel.

16. A kit for enriching and/or sorting unlabeled, microparticles in a fluid sample, the kit comprising:

the multi-stage microfluidic device of claim 1; and a superparamagnetic composition comprising a plurality of magnetic nanoparticles and a surfactant, the superparamagnetic composition adapted to be combined with a carrier fluid to make a superparamagnetic fluid, wherein the superparamagnetic fluid can be the ferrofluid, sheathing ferrofluid, or both, for use in the multi-stage microfluidic device.

17. The kit of claim 16, further comprising:

instructions for combining the magnetic nanoparticles, surfactant, and carrier fluid to make the superparamagnetic fluid and instructions for using the superparamagnetic fluid and the multi-stage microfluidic device to separate cells/particles in a fluid sample.

18. The kit of claim 17, wherein the surfactant is biocompatible.

19. The kit of claim 16, wherein the ferrofluid and the sheathing ferrofluid have a concentration of magnetic nanoparticles of about 0.001-1% (v/V).

20. A method of enriching and/or separating unlabeled, microparticles in a sample comprising a plurality of components, the method comprising:

introducing a fluid sample comprising the sample with the unlabeled microparticles and a first ferrofluid into the first fluid inlet of a multi-stage microfluidic device according to claim 1 at a first flow rate;

flowing the fluid sample through the inertial focusing stage and focusing the microparticles in the fluid sample into a focused fluid sample stream;

combining the focused fluid sample stream from the inertial focusing stage with a sheathing ferrofluid at the first end of ferrohydrodynamic separation stage such that the sheathing ferrofluid serves to further narrow the focused fluid sample stream of microparticles in the fluid sample;

flowing the focused fluid sample stream of microparticles in the ferrohydrodynamic separation channel such that the substantially symmetric magnetic field produced by the magnetic force hydrodynamically causes cells/particles flowing in the channel to be focused away from the center of the channel towards the sides of the channel as a function of the size of the particles, such that larger particles move further toward the sides of the channel than smaller particles; and collecting separated particles from the at least 3 outlets.

21. The method of claim 20, wherein the sample is a lysed blood sample, the microparticles are cells, and the cells include white blood cells and target cells.

22. The method of claim 21, wherein the target cells are selected from circulating tumor cells and lymphocytes.

23. The method of claim 20, wherein the microparticles have varying physical diameters in a range of about 4-40 μm.

24. The method of claim 20, wherein the focused fluid sample stream has a width of about 4-100 μm when it enters the first end of ferrohydrodynamic separation stage.

25. The method of claim 20, wherein the fluid sample is processed in the device at a flow rate of about 200-1400 L/min.

* * * * *